(12) United States Patent
Arena

(10) Patent No.: US 9,484,559 B2
(45) Date of Patent: Nov. 1, 2016

(54) BATTERY CELL ASSEMBLY

(71) Applicant: LG Chem, Ltd., Seoul (KR)

(72) Inventor: Anthony Arena, Macomb, MI (US)

(73) Assignee: LG Chem, Ltd., Seoul (KR)

( * ) Notice: Subject to any disclaimer, the term of this patent is extended or adjusted under 35 U.S.C. 154(b) by 271 days.

(21) Appl. No.: 14/511,389

(22) Filed: Oct. 10, 2014

(65) Prior Publication Data

US 2016/0104874 A1    Apr. 14, 2016

(51) Int. Cl.
| | |
|---|---|
| *H01M 2/10* | (2006.01) |
| *H01M 10/0525* | (2010.01) |
| *H01M 2/02* | (2006.01) |

(52) U.S. Cl.
CPC ............. *H01M 2/1016* (2013.01); *H01M 2/02* (2013.01); *H01M 2/024* (2013.01); *H01M 2/0217* (2013.01); *H01M 2/1022* (2013.01); *H01M 2/1072* (2013.01); *H01M 10/0525* (2013.01)

(58) Field of Classification Search
None
See application file for complete search history.

(56) References Cited

U.S. PATENT DOCUMENTS

| | | |
|---|---|---|
| 1,587,425 A | 6/1926 | Schepp |
| 2,273,244 A | 2/1942 | Cornelius |
| 2,391,859 A | 1/1946 | Babcock |
| 3,503,558 A | 3/1970 | Galiulo et al. |
| 3,522,100 A | 7/1970 | Lindstrom |
| 3,550,681 A | 12/1970 | Stier et al. |
| 3,964,930 A | 6/1976 | Reiser |
| 4,009,752 A | 3/1977 | Wilson |
| 4,063,590 A | 12/1977 | Mcconnell |
| 4,298,904 A | 11/1981 | Koenig |
| 4,305,456 A | 12/1981 | Mueller et al. |
| 4,322,776 A | 3/1982 | Job et al. |
| 4,444,994 A | 4/1984 | Baker et al. |
| 4,518,663 A | 5/1985 | Kodali et al. |

(Continued)

FOREIGN PATENT DOCUMENTS

| | | |
|---|---|---|
| DE | 19639115 A | 3/1998 |
| EP | 1577966 A | 9/2005 |

(Continued)

OTHER PUBLICATIONS

"Gasket". Merriam-Webster. Merriam-Webster. Web. May 30, 2012. <http://www.merriam-webster.com/dictionary/gasket>.

(Continued)

*Primary Examiner* — Ula C Ruddock
*Assistant Examiner* — Tony Chuo
(74) *Attorney, Agent, or Firm* — Buckert Patent & Trademark Law Firm, PC; John F. Buckert

(57) ABSTRACT

A battery cell assembly having first and second frame members is provided. The first frame member has a first rectangular ring-shaped body and a first coupler portion. The first coupler portion has a first tab member with a first metal trim clip member coupled thereto. The second frame member has a second rectangular ring-shaped body and a second coupler portion. The second coupler portion has first and second substantially flat walls and first and second peripheral wall portions defining an interior region. The second substantially flat wall has an aperture extending therethrough. The first metal trim clip member is disposed through the aperture and into the interior region of the second coupler portion, and engages an inner surface of the second substantially flat wall to couple the second frame member to the first frame member.

10 Claims, 13 Drawing Sheets

(56) References Cited

U.S. PATENT DOCUMENTS

| | | |
|---|---|---|
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |
| 5,071,652 A | 12/1991 | Jones et al. |
| 5,186,250 A | 2/1993 | Ouchi et al. |
| 5,214,564 A | 5/1993 | Metzler et al. |
| 5,270,131 A | 12/1993 | Diethelm et al. |
| 5,322,745 A | 6/1994 | Yanagihara et al. |
| 5,329,988 A | 7/1994 | Juger |
| 5,346,786 A | 9/1994 | Hodgetts |
| 5,356,735 A | 10/1994 | Meadows et al. |
| 5,443,926 A | 8/1995 | Holland et al. |
| 5,510,203 A | 4/1996 | Hamada et al. |
| 5,520,976 A | 5/1996 | Giannetti et al. |
| 5,663,007 A | 9/1997 | Ikoma et al. |
| 5,736,836 A | 4/1998 | Hasegawa et al. |
| 5,756,227 A | 5/1998 | Suzuki et al. |
| 5,937,664 A | 8/1999 | Matsuno et al. |
| 5,985,483 A | 11/1999 | Verhoog et al. |
| 6,087,036 A | 7/2000 | Rouillard et al. |
| 6,111,387 A | 8/2000 | Kouzu et al. |
| 6,176,095 B1 | 1/2001 | Porter |
| 6,289,979 B1 | 9/2001 | Kato |
| 6,344,728 B1 | 2/2002 | Kouzu et al. |
| 6,362,598 B2 | 3/2002 | Laig-Horstebrock et al. |
| 6,399,238 B1 | 6/2002 | Oweis et al. |
| 6,422,027 B1 | 7/2002 | Coates, Jr. et al. |
| 6,448,741 B1 | 9/2002 | Inui et al. |
| 6,462,949 B1 | 10/2002 | Parish, IV et al. |
| 6,512,347 B1 | 1/2003 | Hellmann et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,724,172 B2 | 4/2004 | Koo |
| 6,750,630 B2 | 6/2004 | Inoue et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,878,485 B2 | 4/2005 | Ovshinsky et al. |
| 6,982,131 B1 | 1/2006 | Hamada et al. |
| 7,070,874 B2 | 7/2006 | Blanchet et al. |
| 7,143,724 B2 | 12/2006 | Hashizumi et al. |
| 7,150,935 B2 | 12/2006 | Hamada et al. |
| 7,250,741 B2 | 7/2007 | Koo et al. |
| 7,264,902 B2 | 9/2007 | Horie et al. |
| 7,278,389 B2 | 10/2007 | Kirakosyan |
| 7,467,525 B1 | 12/2008 | Ohta et al. |
| 7,531,270 B2 | 5/2009 | Buck et al. |
| 7,591,303 B2 | 9/2009 | Zeigler et al. |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 | 12/2010 | Kelly |
| 7,879,480 B2 | 2/2011 | Yoon et al. |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,011,467 B2 | 9/2011 | Asao et al. |
| 8,030,886 B2 | 10/2011 | Mahalingam et al. |
| 8,067,111 B2 | 11/2011 | Koetting et al. |
| 8,209,991 B2 | 7/2012 | Kondou et al. |
| 8,409,743 B2 | 4/2013 | Okada et al. |
| 8,663,829 B2 | 3/2014 | Koetting et al. |
| 2002/0182493 A1 | 12/2002 | Ovshinsky et al. |
| 2003/0080714 A1 | 5/2003 | Inoue et al. |
| 2003/0211384 A1 | 11/2003 | Hamada et al. |
| 2004/0069474 A1 | 4/2004 | Wu et al. |
| 2005/0026014 A1 | 2/2005 | Fogaing et al. |
| 2005/0089750 A1 | 4/2005 | Ng et al. |
| 2005/0103486 A1 | 5/2005 | Demuth et al. |
| 2005/0110460 A1 | 5/2005 | Arai et al. |
| 2005/0134038 A1 | 6/2005 | Walsh |
| 2006/0234119 A1 | 10/2006 | Kruger et al. |
| 2006/0286450 A1 | 12/2006 | Yoon et al. |
| 2007/0062681 A1 | 3/2007 | Beech |
| 2007/0087266 A1 | 4/2007 | Bourke et al. |
| 2007/0227166 A1 | 10/2007 | Rafalovich et al. |
| 2008/0003491 A1 | 1/2008 | Yahnker et al. |
| 2008/0041079 A1 | 2/2008 | Nishijima et al. |
| 2008/0110189 A1 | 5/2008 | Alston et al. |
| 2008/0182151 A1 | 7/2008 | Mizusaki et al. |
| 2008/0248338 A1 | 10/2008 | Yano et al. |
| 2008/0299446 A1 | 12/2008 | Kelly |
| 2008/0314071 A1 | 12/2008 | Ohta et al. |
| 2009/0074478 A1 | 3/2009 | Kurachi |
| 2009/0087727 A1 | 4/2009 | Harada et al. |
| 2009/0104512 A1 | 4/2009 | Fassnacht et al. |
| 2009/0155680 A1 | 6/2009 | Maguire et al. |
| 2009/0186265 A1 | 7/2009 | Koetting et al. |
| 2009/0258288 A1 | 10/2009 | Weber et al. |
| 2009/0258289 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325054 A1 | 12/2009 | Payne et al. |
| 2009/0325055 A1 | 12/2009 | Koetting et al. |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2010/0304203 A1 | 12/2010 | Buck et al. |
| 2010/0307723 A1 | 12/2010 | Thomas et al. |
| 2011/0000241 A1 | 1/2011 | Favaretto |
| 2011/0020676 A1 | 1/2011 | Kurosawa |
| 2011/0027631 A1 | 2/2011 | Koenigsmann |
| 2011/0027640 A1 | 2/2011 | Gadawski et al. |
| 2011/0041525 A1 | 2/2011 | Kim et al. |
| 2011/0045326 A1 | 2/2011 | Leuthner et al. |
| 2011/0052959 A1 | 3/2011 | Koetting et al. |
| 2011/0189523 A1 | 8/2011 | Eom |
| 2012/0082880 A1 | 4/2012 | Koetting et al. |
| 2012/0171543 A1 | 7/2012 | Hirsch et al. |
| 2013/0045410 A1 | 2/2013 | Yang et al. |
| 2013/0136136 A1 | 5/2013 | Ando et al. |
| 2013/0196205 A1* | 8/2013 | Silk .......... H01M 2/0245 429/99 |
| 2013/0255293 A1 | 10/2013 | Gadawski et al. |
| 2013/0309542 A1 | 11/2013 | Merriman et al. |
| 2014/0050953 A1 | 2/2014 | Yoon et al. |
| 2014/0050966 A1 | 2/2014 | Merriman et al. |
| 2014/0120390 A1 | 5/2014 | Merriman et al. |
| 2014/0147709 A1 | 5/2014 | Ketkar et al. |
| 2014/0227575 A1 | 8/2014 | Ketkar |
| 2014/0308558 A1 | 10/2014 | Merriman et al. |

FOREIGN PATENT DOCUMENTS

| | | |
|---|---|---|
| EP | 1852925 A | 11/2007 |
| EP | 2262048 A | 12/2010 |
| GB | 481891 A | 3/1938 |
| JP | 08111244 A | 4/1996 |
| JP | H09129213 A | 5/1997 |
| JP | H09219213 A | 8/1997 |
| JP | 2001105843 A | 4/2001 |
| JP | 2002038033 A | 2/2002 |
| JP | 2002319383 A | 10/2002 |
| JP | 2002333255 A | 11/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |

(56) References Cited

FOREIGN PATENT DOCUMENTS

| | | |
|---|---|---|
| JP | 2005349955 A | 12/2005 |
| JP | 2006139928 A | 6/2006 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| KR | 20090107443 A | 10/2009 |
| KR | 1020100119497 A | 11/2010 |
| KR | 1020100119498 A | 11/2010 |
| KR | 1020110013269 A | 2/2011 |
| KR | 1020110013270 A | 2/2011 |
| KR | 20110126764 A | 11/2011 |
| WO | 2006101343 A | 9/2006 |
| WO | 2007007503 A | 1/2007 |
| WO | 2007115743 A2 | 10/2007 |
| WO | 2008111162 A | 9/2008 |
| WO | 2009073225 A | 6/2009 |
| WO | 2011145830 A2 | 11/2011 |

OTHER PUBLICATIONS

International Search Report for International application No. PCT/KR2013/004015 dated Sep. 26, 2013.

International Search Report; International Application No. PCT/KR2009/000258; International Filing Date: Jan. 16, 2009; Date of Mailing: Aug. 28, 2009; 2 pages.

International Search Report; International Application No. PCT/KR2009/003428, International Filing Date: Jun. 25, 2009; Date of Mailing: Jan. 22, 2010; 2 pages.

International Search Report; International Application No. PCT/KR2009/003429; International Filing Date: Jun. 25, 2009; Date of Mailing: Jan. 12, 2010; 3 pages.

International Search Report; International Application No. PCT/KR2009/003430; International Filing Date: Jun. 25, 2009; Date of Mailing: Feb. 3, 2010; 2 pages.

International Search Report; International Application No. PCT/KR2009/003434; International Filing Date: Jun. 25, 2009; Date of Mailing: Jan. 18, 2010; 2 pages.

International Search Report; International Application No. PCT/KR2009/003436; International Filing Date: Jun. 25, 2009; Date of Mailing: Jan. 22, 2010; 2 pages.

International Search Report; International Application No. PCT/KR2000/006121; International Filing Date: Oct. 22, 2009; Date of Mailing: May 3, 2010; 2 pages.

International Search Report; International Application No. PCT/KR2010/002334; International Filing Date: Apr. 15, 2010; Date of Mailing: Nov. 29, 2010; 2 pages.

International Search Report; International Application No. PCT/KR2010/002336; International Filing Date: Apr. 15, 2010; Date of Mailing: Jan. 31, 2011; 2 pages.

International Search Report; International Application No. PCT/KR2010/002337; International Filing Date: Apr. 15, 2010; Date of Mailing: May 3, 2010; 2 pages.

International Search Report; International Application No. PCT/KR2010/002340; International Filing Date: Apr. 15, 2010; Date of Mailing: Jan. 31, 2011; 2 pages.

International Search Report; International Application No. PCT/KR2010/004944; International Filing Date: Jul. 28, 2010; Date of Mailing: Apr. 29, 2011; 2 pages.

International Search Report; International Application No. PCT/KR2010/005639; International Filing Date: Aug. 24, 2010; Date of Mailing: Jun. 3, 2011; 2 pages.

\* cited by examiner

BATTERY CELL ASSEMBLY

BACKGROUND

The inventor herein has recognized a need for an improved battery cell assembly having frame members that can be readily coupled together during assembly of the battery cell assembly, and de-coupled from one another for maintenance or repair of the battery cell assembly.

SUMMARY

A battery cell assembly in accordance with an exemplary embodiment is provided. The battery cell assembly includes a first frame member having a first rectangular ring-shaped body and a first coupler portion. The first coupler portion is coupled to and extends outwardly from a first end of the first rectangular ring-shaped body in a first direction. The first coupler portion has a first tab member. The battery cell assembly further includes a first metal trim clip member being disposed on and coupled to the first tab member. The battery cell assembly further includes a second frame member having a second rectangular ring-shaped body and a second coupler portion. The second coupler portion is coupled to and extends outwardly from a first end of the second rectangular ring-shaped body. The second coupler portion has first and second substantially flat walls and first and second peripheral wall portions. The first and second peripheral wall portions of the second coupler portion extend outwardly from a first side of the first substantially flat wall of the second coupler portion. The second substantially flat wall of the second coupler portion is coupled to and between the first and second peripheral wall portions of the second coupler portion and spaced apart from the first substantially flat wall of the second coupler portion. The first and second peripheral wall portions and the first and second substantially flat walls of the second coupler portion define a first interior region therebetween. The second substantially flat wall of the second coupler portion has a first aperture extending therethrough. The first metal trim clip member is at least partially disposed through the first aperture and into the first interior region of the second coupler portion. The first metal trim clip member is adapted to contact and to engage an inner surface of the second substantially flat wall of the second coupler portion in the first interior region to couple the second frame member to the first frame member. The battery cell assembly further includes a first battery cell that is disposed on and held between the first and second frame members.

DETAILED DESCRIPTION

Figure 1:
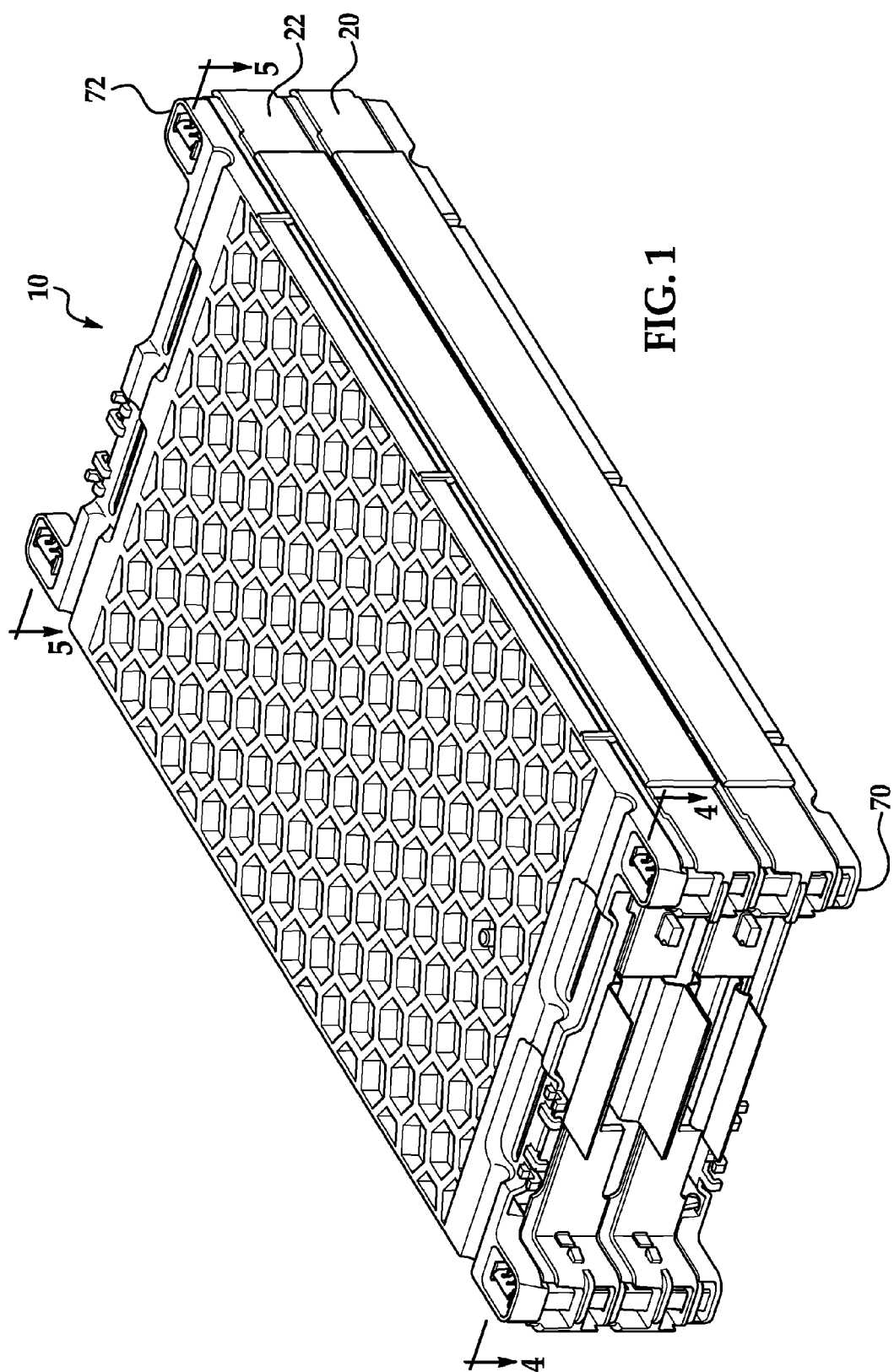
FIG. 1 is a schematic of a battery cell assembly in accordance with an exemplary embodiment.

Referring to FIGS. 1-5, a battery cell assembly 10 in accordance with an exemplary embodiment is provided. The battery cell assembly 10 includes a first frame member 20, a second frame member 22, metal trim clip members 30, 32, 34, 36, 40, 42, 44, 46, 50, 52, 54, 56, battery cells 60, 62, 64, 66, a bottom endcap member 70, and a top endcap member 72. An advantage of the battery cell assembly 10 is that the assembly 10 utilizes metal trim clip members which allow the first frame member 20, the second frame member 22, the bottom endcap member 70, and the top endcap member 72 to be readily coupled together, and de-coupled from one another if necessary for repair or maintenance.

Figure 2:
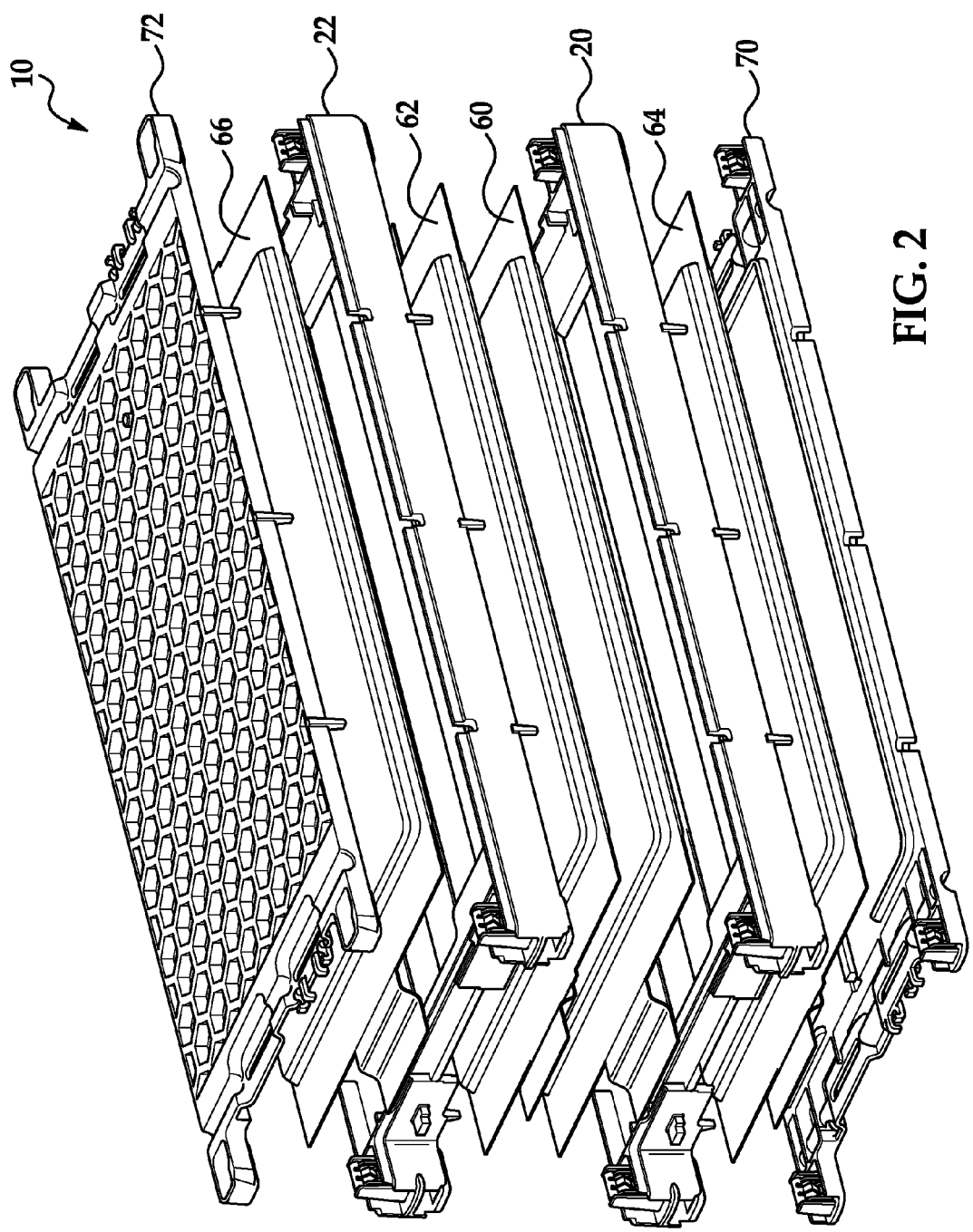
FIG. 2 is an exploded view of the battery cell assembly of FIG. 1.

Referring to FIGS. 1 and 2, the first frame member 20 and the second frame member 22 are adapted to be coupled to one another and to hold the battery cells 60, 62 therebetween. Further, the first frame member 20 and the bottom endcap member 70 are adapted to be coupled to one another and to hold the battery cell 64 therebetween. Finally, the second frame member 22 and the top endcap member 72 are adapted to be coupled to one another and to hold the battery cell 66 therebetween.

Figure 6:
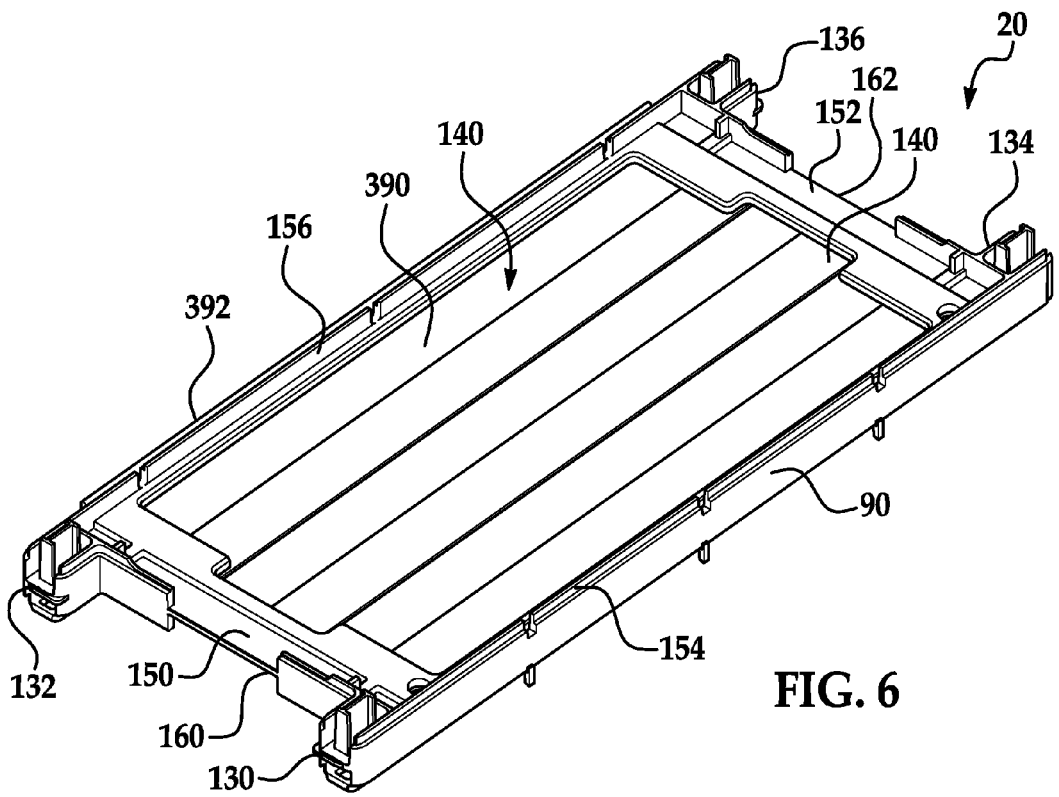
FIG. 6 is a schematic of a first frame member utilized in the battery cell assembly of FIG. 1.
Figure 7:
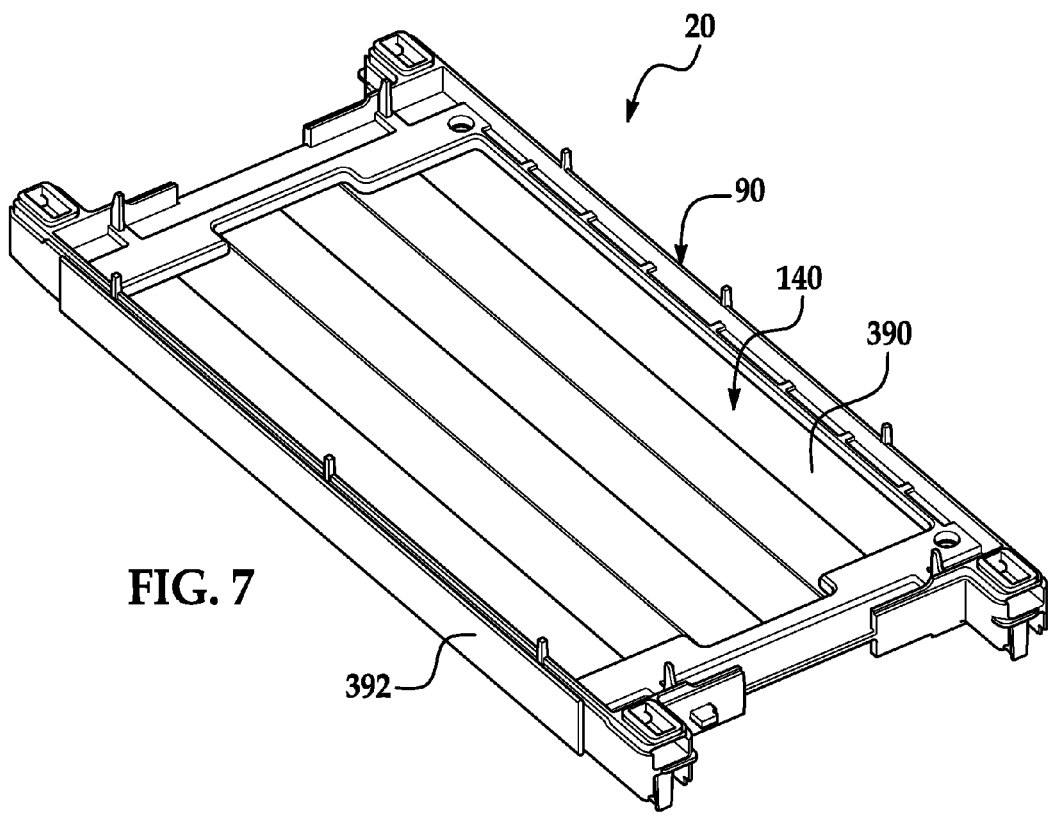
FIG. 7 is another schematic of the first frame member of FIG. 6.
Figure 8:
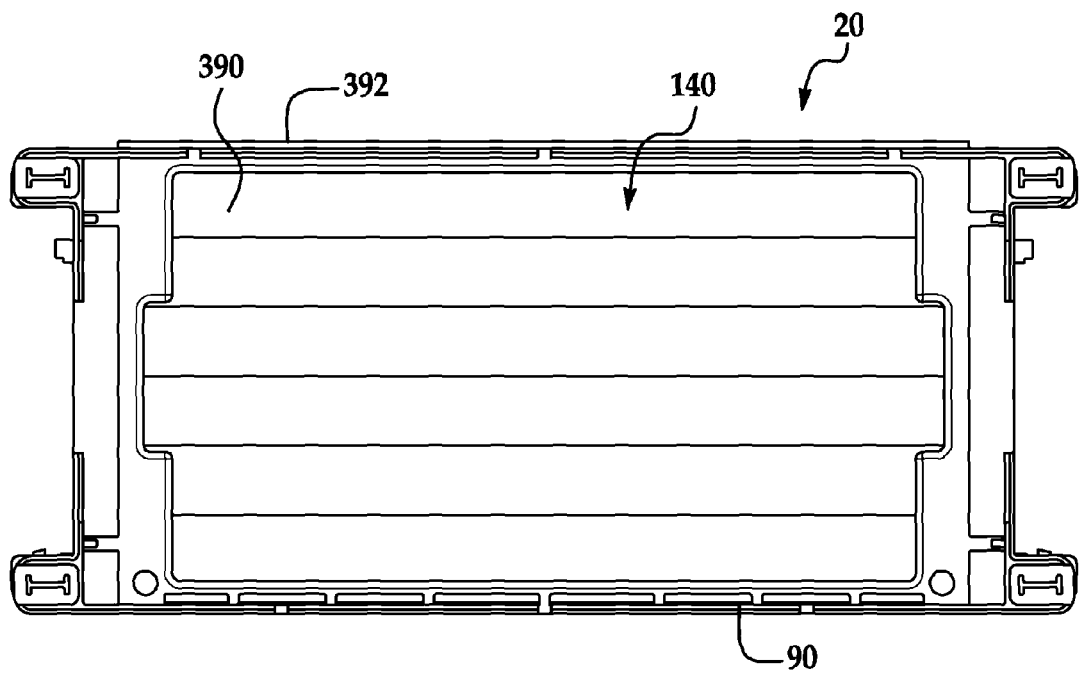
FIG. 8 is a top view of the first frame member of FIG. 6.
Figure 9:
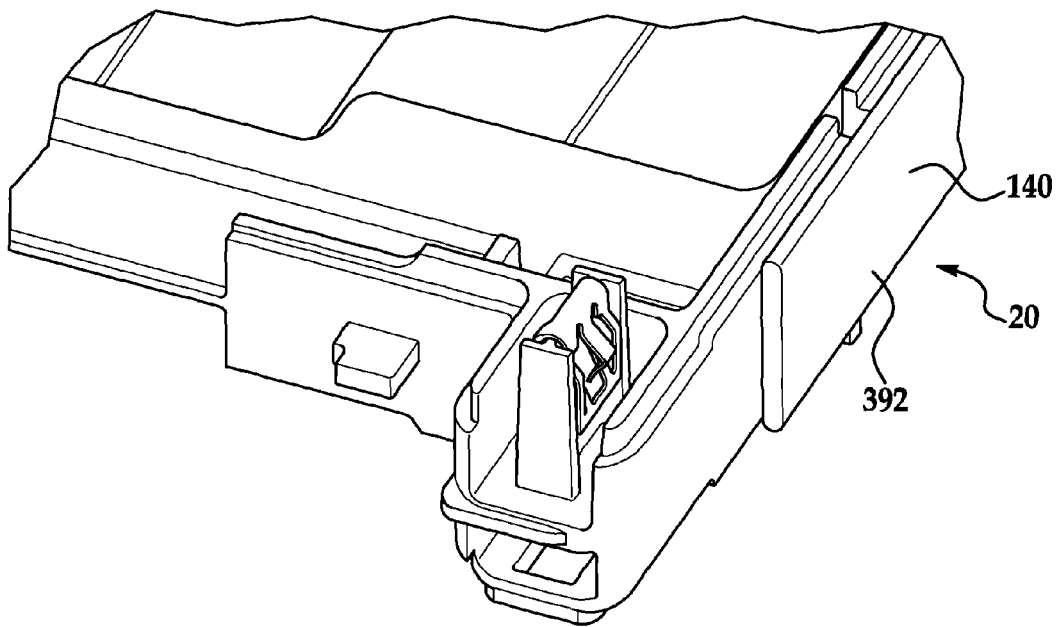
FIG. 9 is an enlarged view of a portion of the first frame member of FIG. 6.

Referring to FIGS. 6-8, the first frame member 20 includes a rectangular ring-shaped body 90, coupler portions 130, 132, 134, 136, and a thermally conductive plate 140. In an exemplary embodiment, the rectangular ring-shaped body 90 and the coupler portions 130, 132, 134, 136 are constructed of plastic. Further, the thermally conductive plate 140 is constructed of a metal such as aluminum or steel for example.

The rectangular ring-shaped body 90 includes side walls 150, 152, 154, 156. The side walls 150, 152 extend substantially parallel to one another and are coupled to and between and to the side walls 154, 156. Also, the side walls 154, 156 extend substantially parallel to one another and are coupled to and between the side walls 150, 152. The rectangular ring-shaped body 90 includes a first end 160 and a second end 162.

Figure 4:
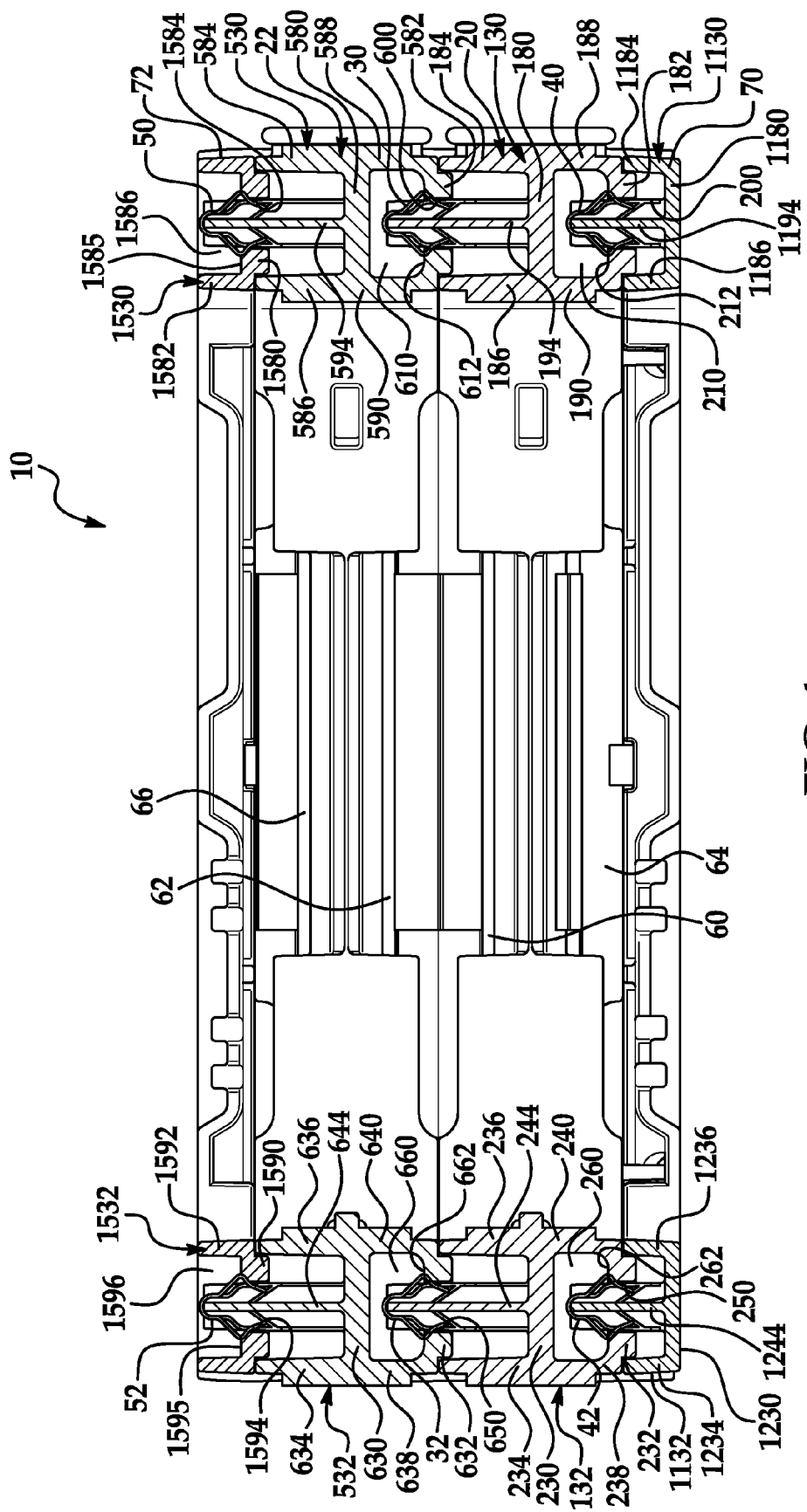
FIG. 4 is a cross-sectional schematic of the battery cell assembly of FIG. 1 taken along lines 4-4.

Referring to FIGS. 4 and 6, the coupler portion 130 is configured to hold the metal trim clip member 30 thereon and to receive a portion of the metal trim clip member 40 therein. The coupler portion 130 is coupled to and extends outwardly from the first end 160 of the rectangular ring-shaped body 90 in a first direction. In particular, the coupler portion 130 is disposed adjacent to both the side wall 150 and the side wall 154 and extends outwardly from the side wall 150 at the first end 160 in the first direction. The first direction is substantially parallel to the side wall 154. The coupler portion 130 includes substantially flat walls 180, 182, peripheral wall portions 184, 186, 188, 190, and a tab member 194. The peripheral wall portions 184, 186 extend in a second direction from the substantially flat wall 180 substantially perpendicular to the substantially flat wall 180. The tab member 194 extends in the second direction from the substantially flat wall 180 substantially perpendicular to the substantially flat wall 180 and is disposed between the peripheral wall portions 184, 186. In an exemplary embodiment, the tab member 194 has an I-shaped cross-sectional profile for holding the metal trim clip member 30 thereon. The peripheral wall portions 188, 190 extend in a third direction from the substantially flat wall 180 substantially perpendicular to the substantially flat wall 180. The third direction is opposite to the second direction. The substantially flat wall 182 is coupled to and between the peripheral wall portions 188, 190 and is spaced apart from the substantially flat wall 180. The substantially flat wall 182 includes an aperture 200 extending therethrough that is sized and shaped to receive an endcap tab member 1194 of the bottom endcap member 70 and a portion of the metal trim clip member 40 therethrough. The substantially flat wall 182 further includes an inner surface 212 disposed proximate to the aperture 200. The peripheral wall portions 188, 190 and the substantially flat walls 180, 182 define an interior region 210 therebetween that communicates with the aperture 200.

The coupler portion 132 is configured to hold the metal trim clip member 32 thereon and to receive a portion of the metal trim clip member 42 therein. The coupler portion 132 is coupled to and extends outwardly from the first end 160 of the rectangular ring-shaped body 90 in the first direction. In particular, the coupler portion 132 is disposed adjacent to both the side wall 150 and the side wall 156 and extends outwardly from the side wall 150 at the first end 160 in the first direction. The first direction is substantially parallel to the side wall 156. The coupler portion 132 includes substantially flat walls 230, 232, peripheral wall portions 234, 236, 238, 240, and a tab member 244. The peripheral wall portions 234, 236 extend in the second direction from the substantially flat wall 230 substantially perpendicular to the substantially flat wall 230. The tab member 244 extends in the second direction from the substantially flat wall 230 substantially perpendicular to the substantially flat wall 230 and is disposed between the peripheral wall portions 234, 236. In an exemplary embodiment, the tab member 244 has an I-shaped cross-sectional profile for holding the metal trim clip member 32 thereon. The peripheral wall portions 238, 240 extend in the third direction from the substantially flat wall 230 substantially perpendicular to the substantially flat wall 230. The third direction is opposite to the second direction. The substantially flat wall 232 is coupled to and between the peripheral wall portions 238, 240 and is spaced apart from the substantially flat wall 230. The substantially flat wall 232 includes an aperture 250 extending therethrough that is sized and shaped to receive an endcap tab member 1244 of the bottom endcap member 70 and a portion of the metal trim clip member 42 therethrough. The substantially flat wall 232 further includes an inner surface 262 disposed proximate to the aperture 250. The peripheral wall portions 238, 240 and the substantially flat walls 230, 232 define an interior region 260 therebetween that communicates with the aperture 250.

Figure 5:
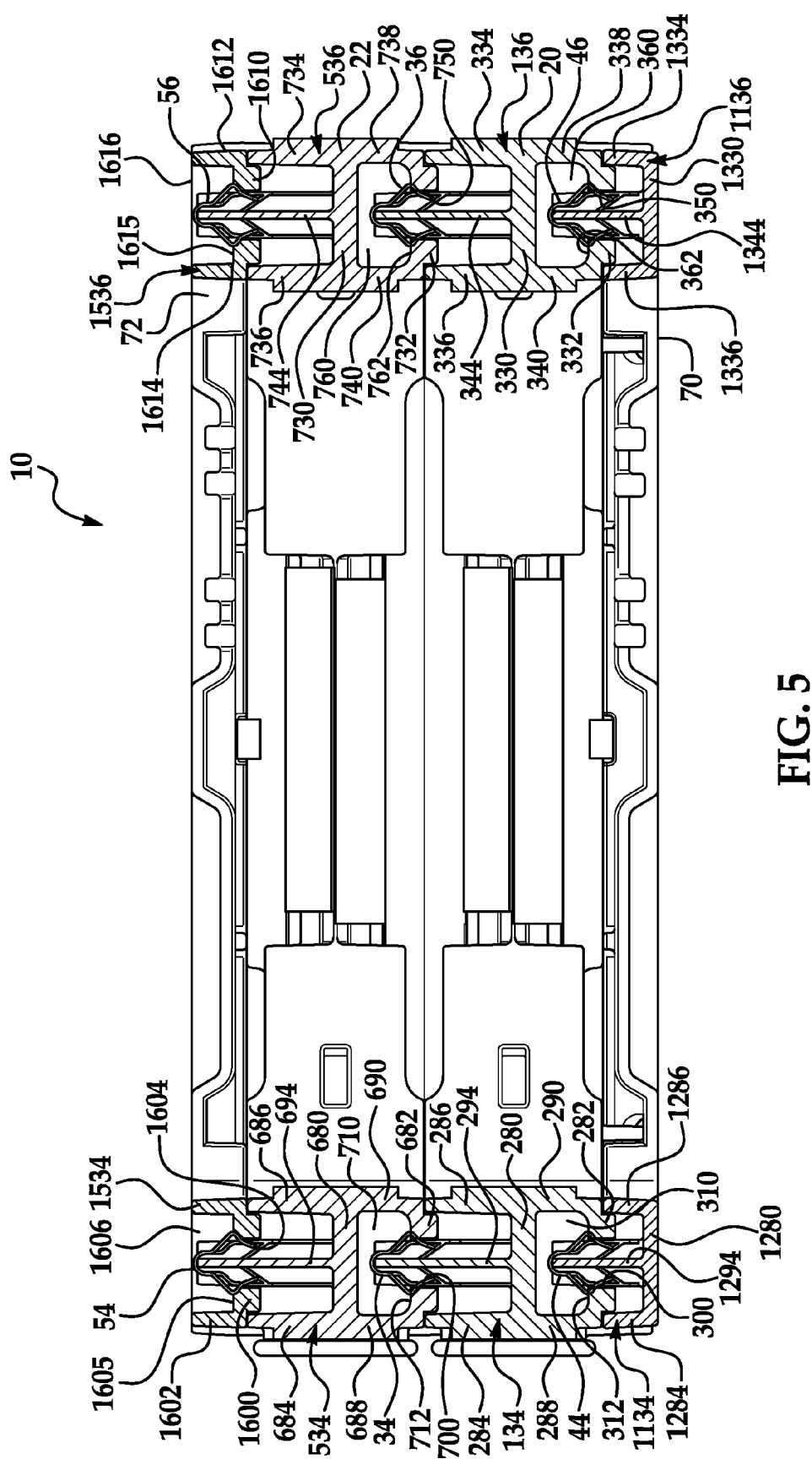
FIG. 5 is a cross-sectional schematic of the battery cell assembly of FIG. 1 taken along lines 5-5.

Referring to FIGS. 5 and 6, the coupler portion 134 is configured to hold the metal trim clip member 34 thereon and to receive a portion of the metal trim clip member 44 therein. The coupler portion 134 is coupled to and extends outwardly from the second end 162 of the rectangular ring-shaped body 90 in a fourth direction. The fourth direction is substantially parallel to the side wall 154 and opposite to the first direction. In particular, the coupler portion 134 is disposed adjacent to both the side wall 152 and the side wall 154 and extends outwardly from the side wall 152 at the second end 162 in the fourth direction. The coupler portion 134 includes substantially flat walls 280, 282, peripheral wall portions 284, 286, 288, 290, and a tab member 294. The peripheral wall portions 284, 286 extend in the second direction from the substantially flat wall 280 substantially perpendicular to the substantially flat wall 280. The tab member 294 extends in the second direction from the substantially flat wall 280 substantially perpendicular to the substantially flat wall 280 and is disposed between the peripheral wall portions 284, 286. In an exemplary embodiment, the tab member 294 has an I-shaped cross-sectional profile for holding the metal trim clip member 34 thereon. The peripheral wall portions 288, 290 extend in the third direction from the substantially flat wall 280 substantially perpendicular to the substantially flat wall 280. The substantially flat wall 282 is coupled to and between the peripheral wall portions 288, 290 and is spaced apart from the substantially flat wall 280. The substantially flat wall 282 includes an aperture 300 extending therethrough that is sized and shaped to receive an endcap tab member 1294 of the bottom endcap member 70 and a portion of the metal trim clip member 44 therethrough. The substantially flat wall 282 further includes an inner surface 312 disposed proximate to the aperture 300. The peripheral wall portions 288, 290 and the substantially flat walls 280, 282 define an interior region 310 therebetween that communicates with the aperture 300.

The coupler portion 136 is configured to hold the metal trim clip member 36 thereon and to receive a portion of the metal trim clip member 46 therein. The coupler portion 136 is coupled to and extends outwardly from the second end 162 of the rectangular ring-shaped body 90 in the fourth direction. In particular, the coupler portion 136 is disposed adjacent to both the side wall 152 and the side wall 156 and extends outwardly from the side wall 152 at the second end 162 in the fourth direction. The coupler portion 136 includes substantially flat walls 330, 332, peripheral wall portions 334, 336, 338, 340, and a tab member 344. The peripheral wall portions 334, 336 extend in the second direction from the substantially flat wall 330 substantially perpendicular to the substantially flat wall 330. The tab member 344 extends in the second direction from the substantially flat wall 330 substantially perpendicular to the substantially flat wall 330 and is disposed between the peripheral wall portions 334, 336. In an exemplary embodiment, the tab member 344 has an I-shaped cross-sectional profile for holding the metal trim clip member 36 thereon. The peripheral wall portions 338, 340 extend in the third direction from the substantially flat wall 330 substantially perpendicular to the substantially flat wall 330. The substantially flat wall 332 is coupled to and between the peripheral wall portions 338, 340 and is spaced apart from the substantially flat wall 330. The substantially flat wall 332 includes an aperture 350 extending therethrough that is sized and shaped to receive an endcap tab member 1344 of the bottom endcap member 70 and a portion of the metal trim clip member 46 therethrough. The substantially flat wall 332 further includes an inner surface 362 disposed proximate to the aperture 350. The peripheral wall portions 338, 340 and the substantially flat walls 330, 332 define an interior region 360 therebetween that communicates with the aperture 350.

Referring to FIGS. 2 and 6-8, the thermally conductive plate 140 is provided to conduct heat energy away from the battery cells 60, 64. The thermally conductive plate 140 has a first plate portion 390 and a second plate portion 392. The second plate portion 392 is coupled to an end of the first plate portion 390 and extends substantially perpendicular to the first plate portion 390. An outer periphery of the first plate portion 390 is coupled to the side walls 150, 152, 154, 156 of the rectangular ring-shaped body 90. The first plate portion 390 is disposed against the battery cells 60, 64. A portion of the first plate portion 390 extends through the side wall 156 of the rectangular ring-shaped body 90. The second plate portion 392 is disposed on an exterior surface of the side wall 156 of the rectangular ring-shaped body 90.

Referring to FIGS. 4, 5, 6, 10 and 11, the second frame member 22 includes a rectangular ring-shaped body 490, coupler portions 530, 532, 534, 536, and a thermally conductive plate 540. In an exemplary embodiment, the rectangular ring-shaped body 490 and the coupler portions 530, 532, 534, 536 are constructed of plastic. Further, the thermally conductive plate 540 is constructed of a metal such as aluminum or steel for example.

The rectangular ring-shaped body 490 includes side walls 550, 552, 554, 556. The side walls 550, 552 extend substantially parallel to one another and are coupled to and between and to the side walls 554, 556. Also, the side walls 554, 556 extend substantially parallel to one another and are coupled to and between the side walls 550, 552. The rectangular ring-shaped body 490 includes a first end 560 and a second end 562.

Figure 10:
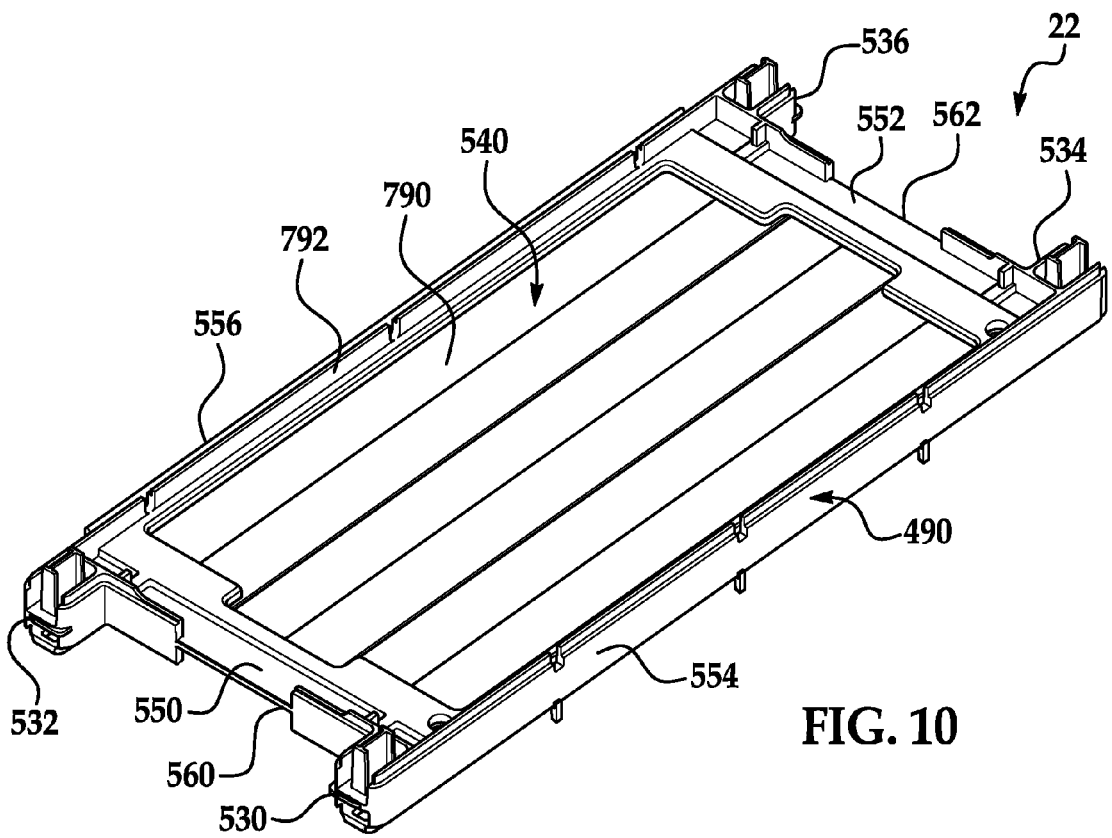
FIG. 10 is a schematic of a second frame member utilized in the battery cell assembly of FIG. 1.

Referring to FIGS. 4 and 10, the coupler portion 530 is configured to hold the metal trim clip member 50 thereon and to receive a portion of the metal trim clip member 30 therein. The coupler portion 530 is coupled to and extends outwardly from the first end 560 of the rectangular ring-shaped body 490 in the first direction. In particular, the coupler portion 530 is disposed adjacent to both the side wall 550 and the side wall 554 and extends outwardly from the side wall 550 at the first end 560 in the first direction. The first direction is substantially parallel to the side wall 554. The coupler portion 530 includes substantially flat walls 580, 582, peripheral wall portions 584, 586, 588, 590, and a tab member 594. The peripheral wall portions 584, 586 extend in the second direction from the substantially flat wall 580 substantially perpendicular to the substantially flat wall 580. The tab member 594 extends in the second direction from the substantially flat wall 580 substantially perpendicular to the substantially flat wall 580 and is disposed between the peripheral wall portions 584, 586. In an exemplary embodiment, the tab member 594 has an I-shaped cross-sectional profile for holding the metal trim clip member 50 thereon. The peripheral wall portions 588, 590 extend in a third direction from the substantially flat wall 580 substantially perpendicular to the substantially flat wall 580. The third direction is opposite to the second direction. The substantially flat wall 582 is coupled to and between the peripheral wall portions 588, 590 and is spaced apart from the substantially flat wall 580. The substantially flat wall 582 includes an aperture 600 extending therethrough that is sized and shaped to receive a tab member 194 of the first frame member 20 and a portion of the metal trim clip member 30 therethrough. The substantially flat wall 582 further includes an inner surface 612 disposed proximate to the aperture 600. The peripheral wall portions 588, 590 and the substantially flat walls 580, 582 define an interior region 610 therebetween that communicates with the aperture 600.

The coupler portion 532 is configured to hold the metal trim clip member 52 thereon and to receive a portion of the metal trim clip member 32 therein. The coupler portion 532 is coupled to and extends outwardly from the first end 560 of the rectangular ring-shaped body 490 in the first direction. In particular, the coupler portion 532 is disposed adjacent to both the side wall 550 and the side wall 556 and extends outwardly from the side wall 550 at the first end 560 in the first direction. The first direction is substantially parallel to the side wall 556. The coupler portion 532 includes substantially flat walls 630, 632, peripheral wall portions 634, 636, 638, 640, and a tab member 644. The peripheral wall portions 634, 636 extend in the second direction from the substantially flat wall 630 substantially perpendicular to the substantially flat wall 630. The tab member 644 extends in the second direction from the substantially flat wall 630 substantially perpendicular to the substantially flat wall 630 and is disposed between the peripheral wall portions 634, 636. In an exemplary embodiment, the tab member 644 has an I-shaped cross-sectional profile for holding the metal trim clip member 52 thereon. The peripheral wall portions 638, 640 extend in the third direction from the substantially flat wall 630 substantially perpendicular to the substantially flat wall 630. The third direction is opposite to the second direction. The substantially flat wall 632 is coupled to and between the peripheral wall portions 638, 640 and is spaced apart from the substantially flat wall 630. The substantially flat wall 632 includes an aperture 650 extending therethrough that is sized and shaped to receive a tab member 244 of the first frame member 20 and a portion of the metal trim clip member 32 therethrough. The substantially flat wall 632 further includes an inner surface 662 disposed proximate to the aperture 650. The peripheral wall portions 638, 640 and the substantially flat walls 630, 632 define an interior region 660 therebetween that communicates with the aperture 650.

Referring to FIGS. 5 and 10, the coupler portion 534 is configured to hold the metal trim clip member 54 thereon and to receive a portion of the metal trim clip member 34 therein. The coupler portion 534 is coupled to and extends outwardly from the second end 562 of the rectangular ring-shaped body 490 in the fourth direction. The fourth direction is substantially parallel to the side wall 554 and opposite to the first direction. In particular, the coupler portion 534 is disposed adjacent to both the side wall 552 and the side wall 554 and extends outwardly from the side wall 552 at the second end 562 in the fourth direction. The coupler portion 534 includes substantially flat walls 680, 682, peripheral wall portions 684, 686, 688, 690, and a tab member 694. The peripheral wall portions 684, 686 extend in the second direction from the substantially flat wall 680 substantially perpendicular to the substantially flat wall 680. The tab member 694 extends in the second direction from the substantially flat wall 680 substantially perpendicular to the substantially flat wall 680 and is disposed between the peripheral wall portions 684, 686. In an exemplary embodiment, the tab member 694 has an I-shaped cross-sectional profile for holding the metal trim clip member 54 thereon. The peripheral wall portions 688, 690 extend in the third direction from the substantially flat wall 680 substantially perpendicular to the substantially flat wall 680. The substantially flat wall 682 is coupled to and between the peripheral wall portions 688, 690 and is spaced apart from the substantially flat wall 680. The substantially flat wall 682 includes an aperture 700 extending therethrough that is sized and shaped to receive a tab member 294 of the first frame member 20 and a portion of the metal trim clip member 34 therethrough. The substantially flat wall 682 further includes an inner surface 712 disposed proximate to the aperture 700. The peripheral wall portions 688, 690 and the substantially flat walls 680, 682 define an interior region 710 therebetween that communicates with the aperture 700.

The coupler portion 536 is configured to hold the metal trim clip member 56 thereon and to receive a portion of the metal trim clip member 36 therein. The coupler portion 536 is coupled to and extends outwardly from the second end 562 of the rectangular ring-shaped body 490 in the fourth direction. In particular, the coupler portion 536 is disposed adjacent to both the side wall 552 and the side wall 556 and extends outwardly from the side wall 552 at the second end 562 in the fourth direction. The coupler portion 536 includes substantially flat walls 730, 732, peripheral wall portions 734, 736, 738, 740, and a tab member 744. The peripheral wall portions 734, 736 extend in the second direction from the substantially flat wall 730 substantially perpendicular to the substantially flat wall 730. The tab member 744 extends in the second direction from the substantially flat wall 730 substantially perpendicular to the substantially flat wall 730 and is disposed between the peripheral wall portions 734, 736. In an exemplary embodiment, the tab member 744 has an I-shaped cross-sectional profile for holding the metal trim clip member 56 thereon. The peripheral wall portions 738, 740 extend in the third direction from the substantially flat wall 730 substantially perpendicular to the substantially flat wall 730. The substantially flat wall 732 is coupled to and between the peripheral wall portions 738, 740 and is spaced apart from the substantially flat wall 730. The substantially flat wall 732 includes an aperture 750 extending therethrough that is sized and shaped to receive a tab member 344 of the first frame member 20 and a portion of the metal trim clip member 36 therethrough. The substantially flat wall 732 further includes an inner surface 762 disposed proximate to the aperture 750. The peripheral wall portions 738, 740 and the substantially flat walls 730, 732 define an interior region 760 therebetween that communicates with the aperture 750.

Figure 11:
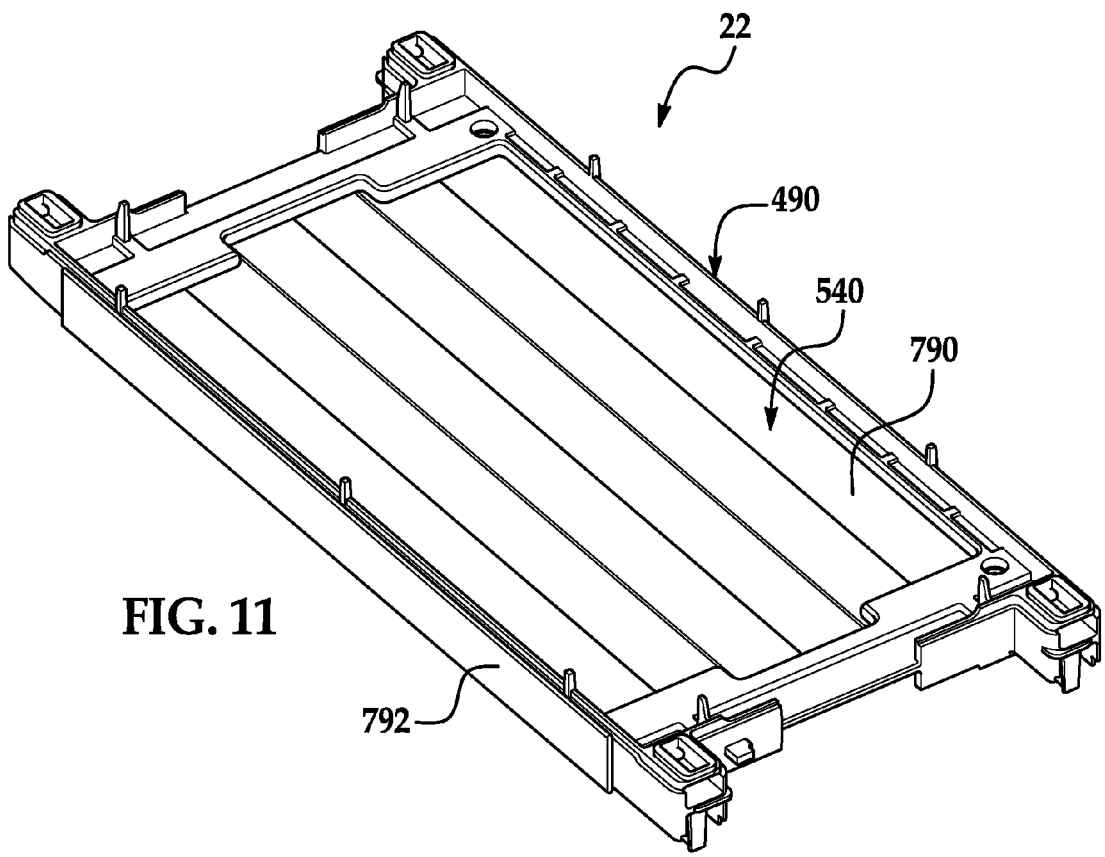
FIG. 11 is another schematic of the second frame member of FIG. 10.

Referring to FIGS. 2 and 10-11, the thermally conductive plate 540 is provided to conduct heat energy away from the battery cells 62, 66. The thermally conductive plate 540 has a first plate portion 790 and a second plate portion 792. The second plate portion 792 is coupled to an end of the first plate portion 790 and extends substantially perpendicular to the first plate portion 790. An outer periphery of the first plate portion 790 is coupled to the side walls 550, 552, 554, 556 of the rectangular ring-shaped body 490. The first plate portion 790 is disposed against and between the battery cells 62, 66. A portion of the first plate portion 790 extends through the side wall 556 of the rectangular ring-shaped body 490. The second plate portion 792 is disposed on an exterior surface of the side wall 556 of the rectangular ring-shaped body 490.

Referring to FIGS. 4, 5 and 12-14, the metal trim clip members 30, 32, 34, 36 are provided to couple the first frame member 20 to the second frame member 22. Since the structure of the metal trim clip members are identical to one another, only the structure of the metal trim clip member 30 will be discussed in greater detail below.

The metal trim clip member 30 is centered about a central plane 960 and having first and second wall portions 810, 812. The first wall portion 810 has first and second ends 820, 822. The second wall portion 810 has first and second ends 920, 922. The first end 820 of the first wall portion 810 is integrally coupled to the first end 920 of the second wall portion 812. The first and second wall portions 810, 812 define a gap 952 between the second end 822 of the first wall portion 810 and the second end 922 of the second wall portion 812.

The first wall portion 810 includes an arcuate-shaped portion 826, a straight portion 828, a bent portion 830, and a straight portion 832. The straight portion 828 is coupled to and between the arcuate-shaped portion 826 and the bent portion 830. An aperture 834 extends through portions of the arcuate-shaped portion 826, the straight portion 828, the bent portion 830, and the straight portion 832 such that the first wall portion 810 defines trim tabs 840, 842, and a v-shaped biasing member 850. The trim tabs 840, 842 extend across a portion of the gap 952 toward the second wall portion 812. The v-shaped biasing member 850 is disposed between the trim tabs 840, 842 and has an apex pointing away from the second wall portion 812.

The second wall portion 812 includes an arcuate-shaped portion 926, a straight portion 928, a bent portion 930, and a straight portion 932. The straight portion 928 is coupled to and between the arcuate-shaped portion 926 and the bent portion 930. An aperture 934 extends through portions of the arcuate-shaped portion 926, the straight portion 928, the bent portion 930, and the straight portion 932 such that the second wall portion 812 defines trim tabs 940, 942, and a v-shaped biasing member 950. The trim tabs 940, 942 extend across a portion of the gap 952 toward the first wall portion 810. The v-shaped biasing member 950 is disposed between the trim tabs 940, 942 and has an apex pointing away from the first wall portion 810.

Figure 12:
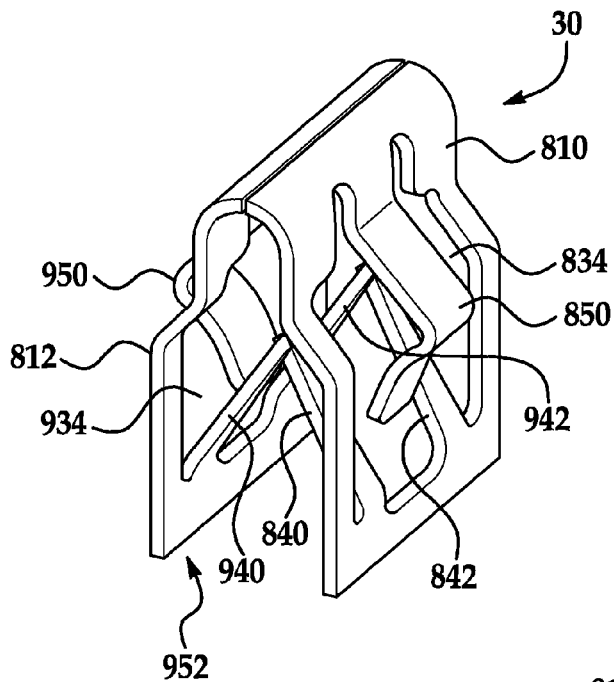
FIG. 12 is a schematic of a metal trim clip member utilized in the battery cell assembly of FIG. 1.
Figure 13:
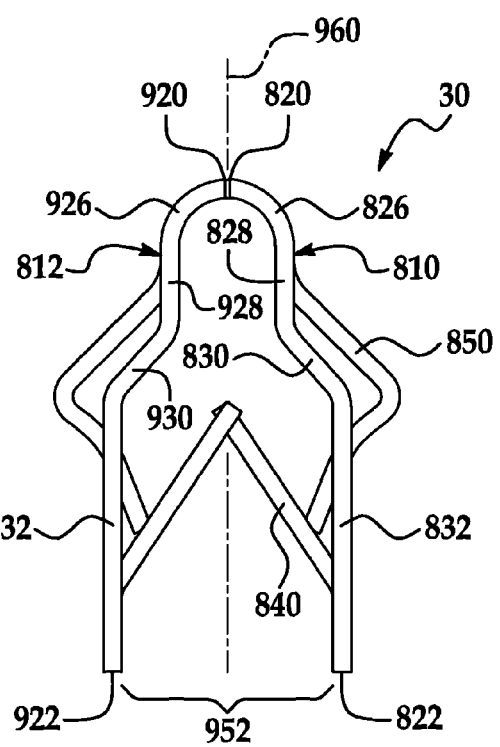
FIG. 13 is a side view of the metal trim clip member of FIG. 12.
Figure 14:
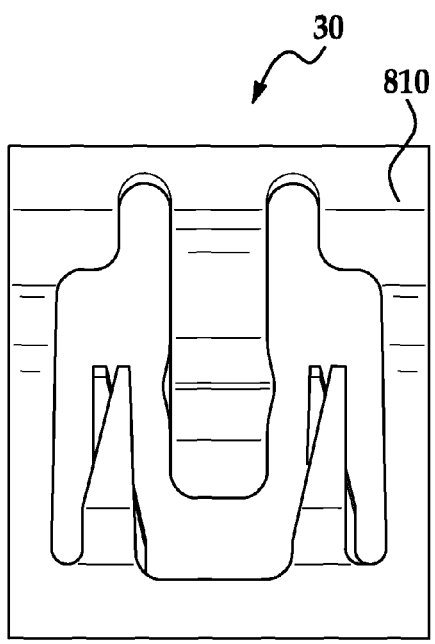
FIG. 14 is another side view of the metal trim clip member of FIG. 12.
Figure 15:
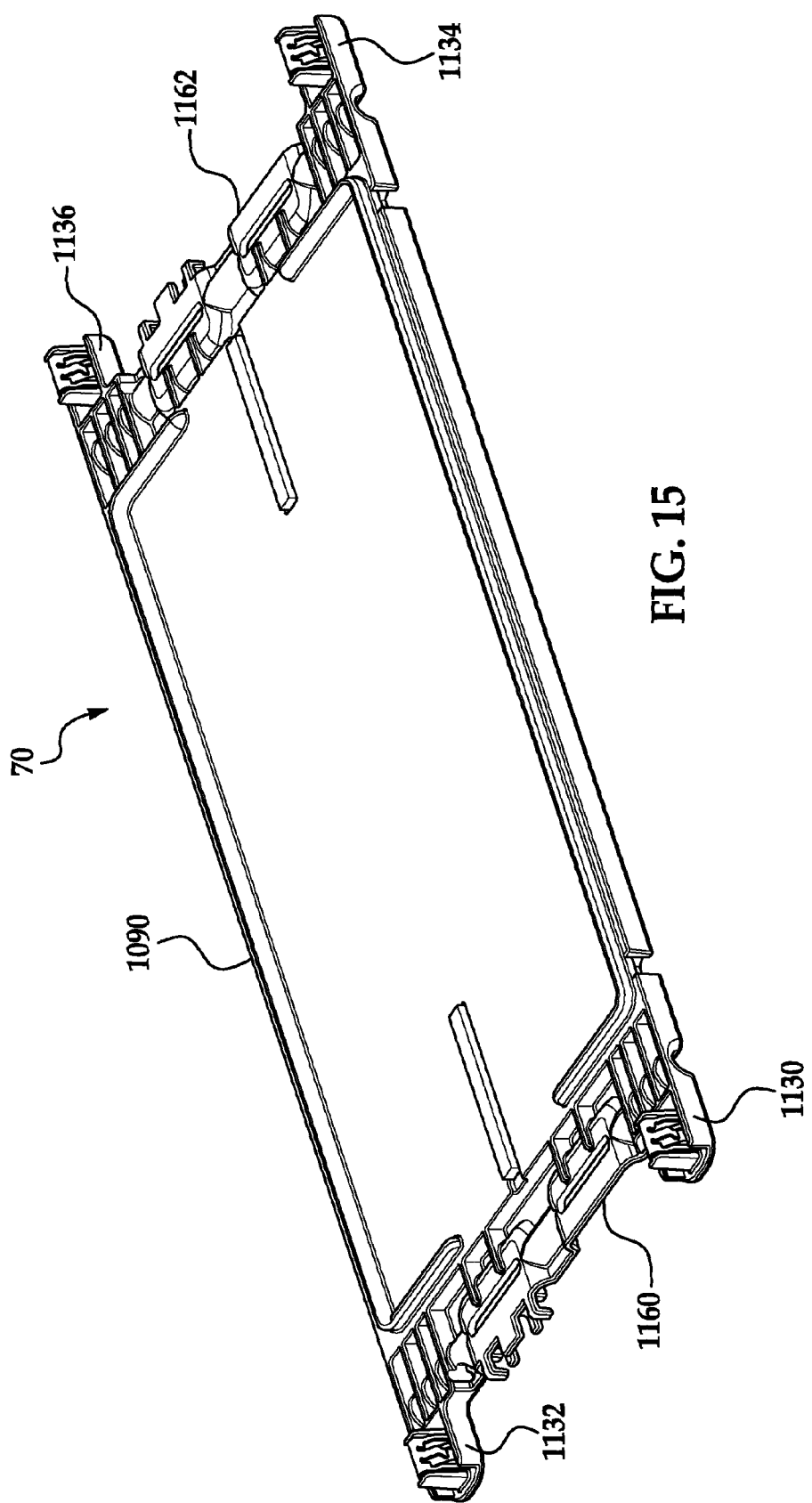
FIG. 15 is a schematic of a bottom endcap member utilized in the battery cell assembly of FIG. 1.
Figure 16:
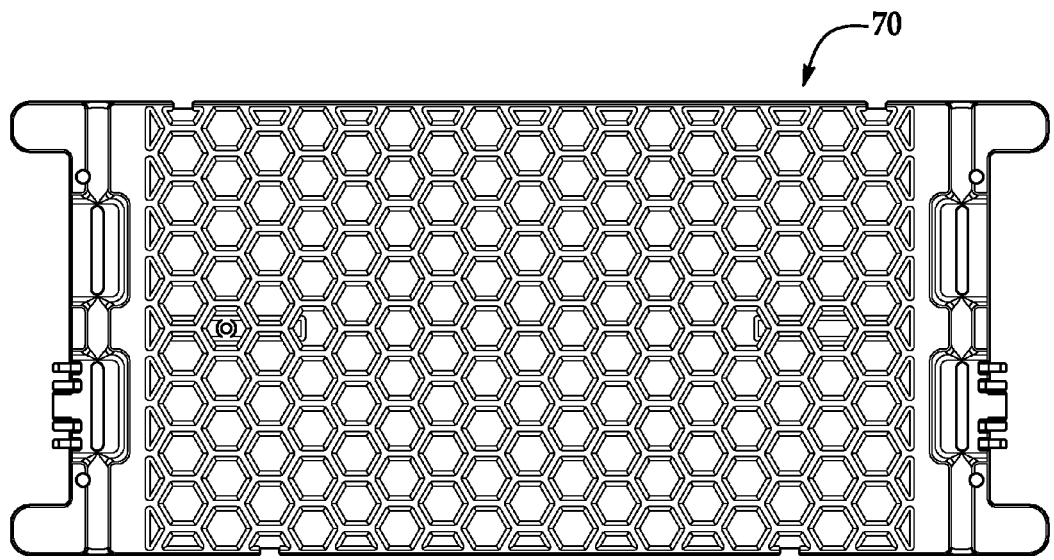
FIG. 16 is a bottom view of the bottom endcap member of FIG. 15.
Figure 17:
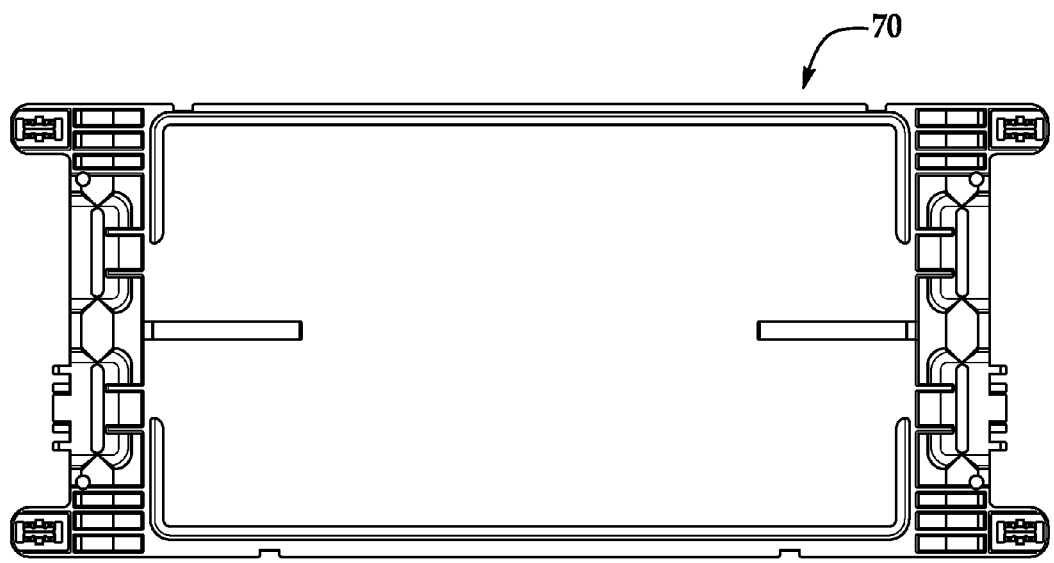
FIG. 17 is a top view of the bottom endcap member of FIG. 15.
Figure 18:
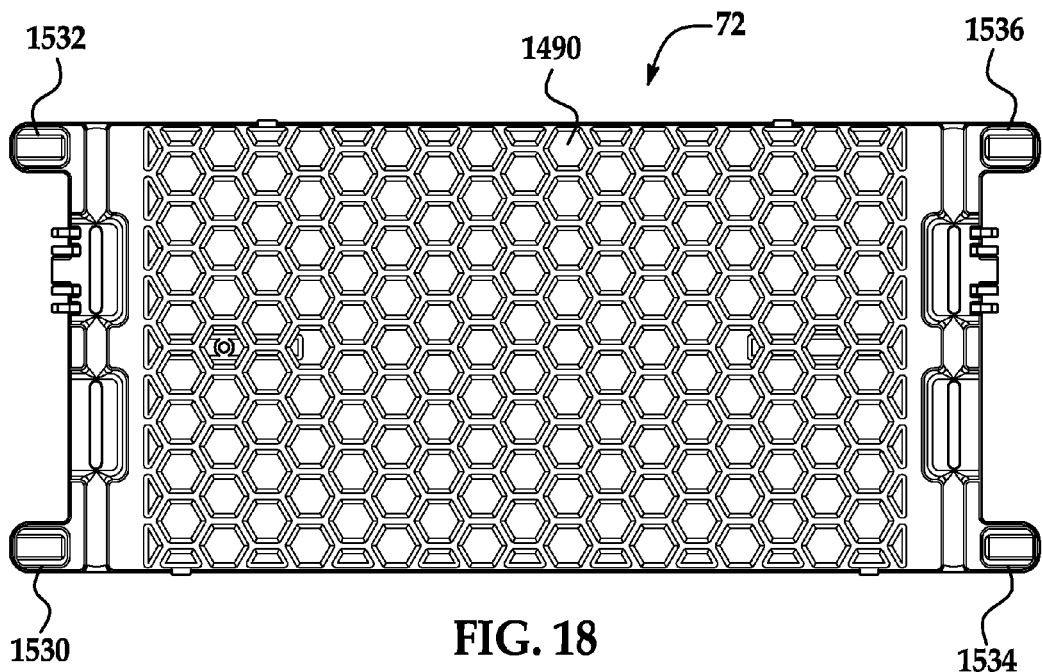
FIG. 18 is a schematic of a top endcap member utilized in the battery cell assembly of FIG. 1.
Figure 20:
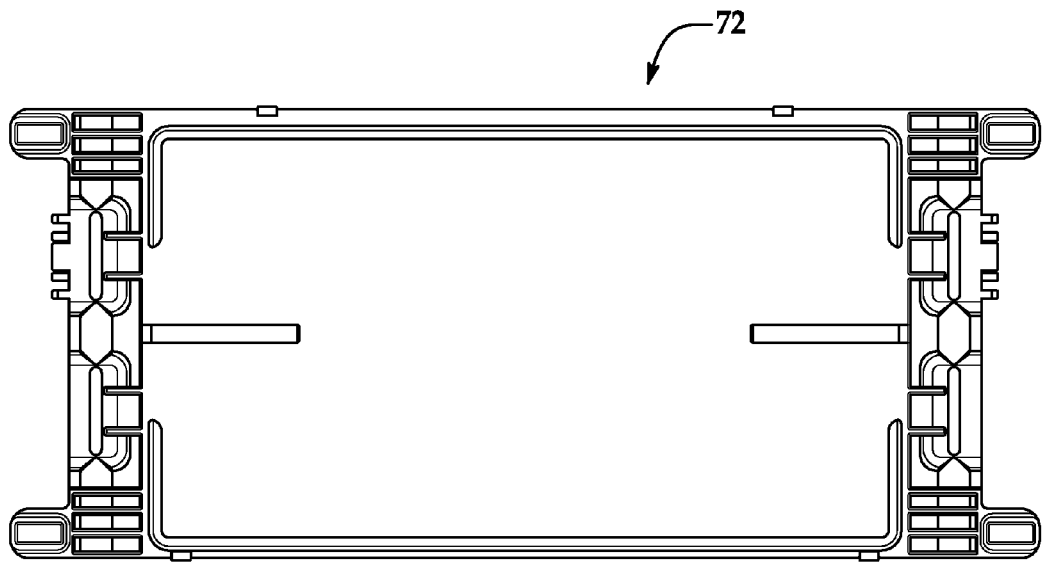
FIG. 20 is a bottom view of the top endcap member of FIG. 18.
Figure 19:
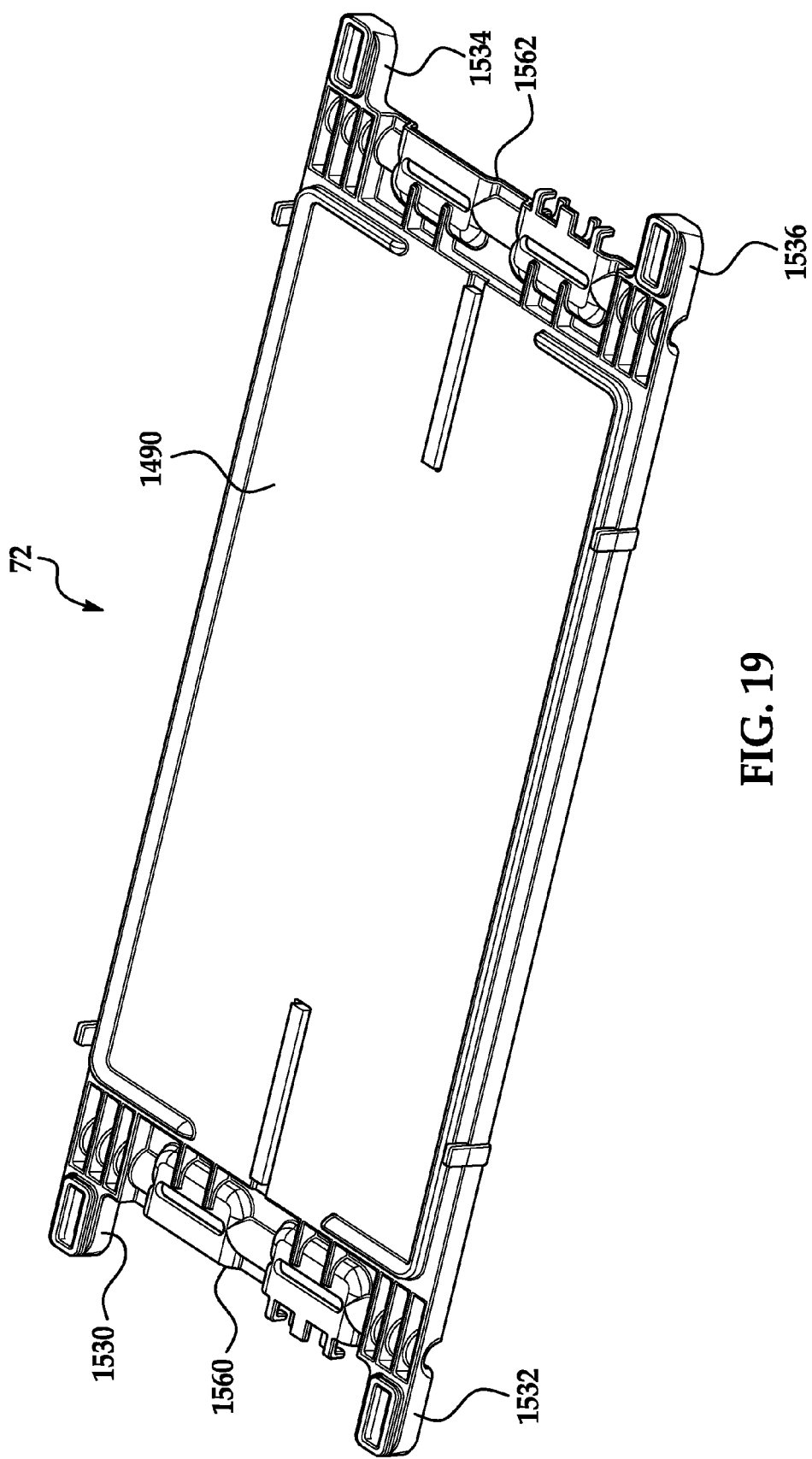
FIG. 19 is a bottom view of the top endcap member of FIG. 18.

Referring to FIGS. 4 and 12, during operation, the trim tabs 840, 842 contact a first side of the tab member 194 of the coupler portion 130 of the first frame member 20 and the trim tabs 940, 942 contact an opposite second side of the tab member 194 to hold the tab member 194 therebetween. Further, the v-shaped biasing member 850 and the v-shaped biasing member 950 are adapted to contact and engage the inner surface 612 of the substantially flat wall 582 of the coupler portion 530 of the second frame member 22 in the interior region 610 to couple the second frame member 22 to the first frame member 20.

In a similar manner, the metal trim clip member 32 is coupled to the tab member 244 of the coupler portion 132, and the metal trim clip member 32 contacts and engages the inner surface 662 of the substantially flat wall 632 of the coupler portion 532 of the second frame member 22 in the interior region 660 to couple the second frame member 22 to the first frame member 20.

Further, the metal trim clip member 34 is coupled to the tab member 294 of the coupler portion 134, and the metal trim clip member 34 contacts and engages the inner surface 712 of the substantially flat wall 682 of the coupler portion 534 of the second frame member 22 in the interior region 710 to couple the second frame member 22 to the first frame member 20.

Further, the metal trim clip member 36 is coupled to the tab member 344 of the coupler portion 136, and the metal trim clip member 36 contacts and engages the inner surface 762 of the substantially flat wall 732 of the coupler portion 536 of the second frame member 22 in the interior region 760 to couple the second frame member 22 to the first frame member 20.

Figure 3:
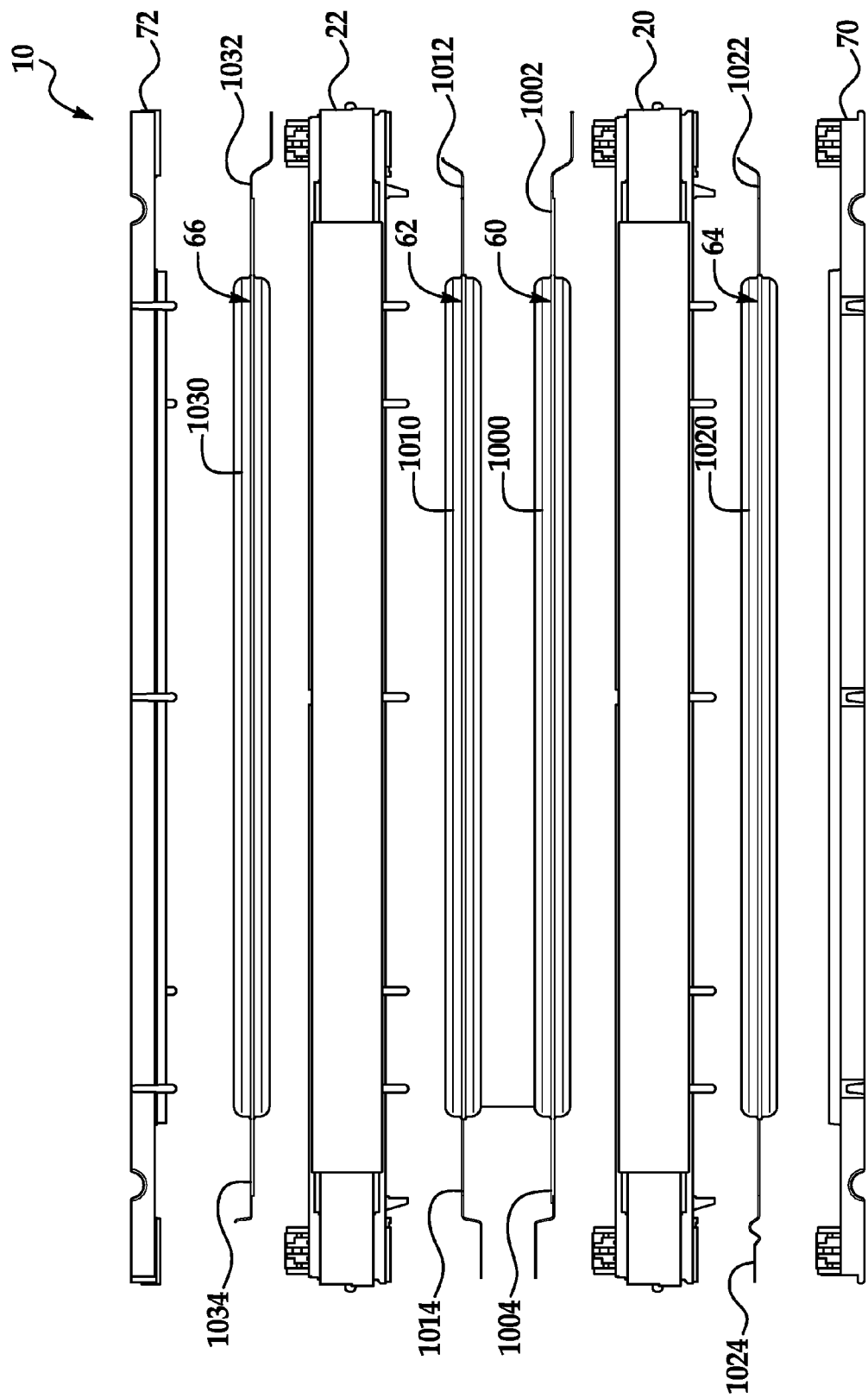
FIG. 3 is another exploded view of the battery cell assembly of FIG. 1.

Referring to FIG. 3, the battery cells 60, 62, 64 and 66 are each configured to generate an operational voltage. In one exemplary embodiment, the battery cells 60-66 are pouch-type lithium-ion battery cells that have a substantially rectangular-shaped body portion and a pair of electrical terminals. In an exemplary embodiment, the battery cells 60-66 are electrically coupled in series with one another. The structure of the battery cells 60-66 are identical to one another.

The battery cell 60 includes a body portion 1000 and electrical terminals 1002, 1004 extending outwardly from first and second ends, respectively, of the body portion 1000. Also, the battery cell 62 includes a body portion 1010 and electrical terminals 1012, 1014 extending outwardly from first and second ends, respectively, of the body portion 1010. Further, the battery cell 64 includes a body portion 1020 and electrical terminals 1022, 1024 extending outwardly from first and second ends, respectively, of the body portion 1020. Still further, the battery cell 66 includes a body portion 1030 and electrical terminals 1032, 1034 extending outwardly from first and second ends, respectively, of the body portion 1030.

Referring to FIGS. 4, 5 and 15-17, the bottom endcap member 70 includes a rectangular body 1090, coupler portions 1130, 1132, 1134 and 1136. In an exemplary embodiment, the rectangular body 1090 and the coupler portions 1130, 1132, 1134, 1136 are constructed of plastic. The rectangular body 1090 includes a first end 1160 and a second end 1162.

The endcap coupler portion 1130 is configured to hold the metal trim clip member 40 thereon. The endcap coupler portion 1130 is coupled to and extends outwardly from the first end 1160 of the rectangular body 1090 in the first direction. The endcap coupler portion 1130 includes a substantially flat wall 1180, peripheral wall portions 1184, 1186, and an endcap tab member 1194. The peripheral wall portions 1184, 1186 extend in the second direction from the substantially flat wall 1180 substantially perpendicular to the substantially flat wall 1180. The tab member 1194 extends in the second direction from the substantially flat wall 1180 substantially perpendicular to the substantially flat wall 1180 and is disposed between the peripheral wall portions 1184, 1186. In an exemplary embodiment, the tab member 1194 has an I-shaped cross-sectional profile for holding the metal trim clip member 40 thereon.

The endcap coupler portion 1132 is configured to hold the metal trim clip member 42 thereon. The endcap coupler portion 1132 is coupled to and extends outwardly from the first end 1160 of the rectangular body 1090 in the first direction. The endcap coupler portion 1132 includes a substantially flat wall 1230, peripheral wall portions 1234, 1236, and an endcap tab member 1244. The peripheral wall portions 1234, 1236 extend in the second direction from the substantially flat wall 1230 substantially perpendicular to the substantially flat wall 1230. The endcap tab member 1244 extends in the second direction from the substantially flat wall 1230 substantially perpendicular to the substantially flat wall 1230 and is disposed between the peripheral wall portions 1234, 1236. In an exemplary embodiment, the tab member 1244 has an I-shaped cross-sectional profile for holding the metal trim clip member 42 thereon.

Referring to FIGS. 5 and 15-17, the endcap coupler portion 1134 is configured to hold the metal trim clip member 44 thereon. The endcap coupler portion 1134 is coupled to and extends outwardly from the second end 1162 of the rectangular body 1090 in a fourth direction. The fourth direction is substantially parallel to the side wall 154 and opposite to the first direction. The endcap coupler portion 1134 includes a substantially flat wall 1280, peripheral wall portions 1284, 1286, and an endcap tab member 1294. The peripheral wall portions 1284, 1286 extend in the second direction from the substantially flat wall 1280 substantially perpendicular to the substantially flat wall 1280. The endcap tab member 1294 extends in the second direction from the substantially flat wall 1280 substantially perpendicular to the substantially flat wall 1280 and is disposed between the peripheral wall portions 1284, 1286. In an exemplary embodiment, the endcap tab member 1294 has an I-shaped cross-sectional profile for holding the metal trim clip member 44 thereon.

The endcap coupler portion 1136 is configured to hold the metal trim clip member 46 thereon. The endcap portion 1136 is coupled to and extends outwardly from the second end 1162 of the rectangular body 1090 in the fourth direction. The endcap coupler portion 1136 includes a substantially flat walls 1330, peripheral wall portions 1334, 1336, and an endcap tab member 1344. The peripheral wall portions 1334, 1336 extend in the second direction from the substantially flat wall 1330 substantially perpendicular to the substantially flat wall 1330. The endcap tab member 1344 extends in the second direction from the substantially flat wall 1330 substantially perpendicular to the substantially flat wall 1330 and is disposed between the peripheral wall portions 1334, 1336. In an exemplary embodiment, the endcap tab member 1344 has an I-shaped cross-sectional profile for holding the metal trim clip member 46 thereon.

Referring to FIGS. 4 and 5, the metal trim clip member 40 is coupled to the endcap tab member 1194 of the endcap coupler portion 1130, and the metal trim clip member 40 contacts and engages the inner surface 212 of the substantially flat wall 182 of the coupler portion 130 of the first frame member 20 in the interior region 210 to couple the bottom endcap member 70 to the first frame member 20.

The metal trim clip member 42 is coupled to the endcap tab member 1244 of the endcap coupler portion 1132, and the metal trim clip member 42 contacts and engages the inner surface 262 of the substantially flat wall 232 of the coupler portion 132 of the first frame member 20 in the interior region 260 to couple the bottom endcap member 70 to the first frame member 20.

Referring to FIG. 5, the metal trim clip member 44 is coupled to the endcap tab member 1294 of the endcap coupler portion 1134, and the metal trim clip member 44 contacts and engages the inner surface 312 of the substantially flat wall 282 of the coupler portion 134 of the first frame member 20 in the interior region 310 to couple the bottom endcap member 70 to the first frame member 20.

Further, the metal trim clip member 46 is coupled to the endcap tab member 1344 of the endcap coupler portion 1136, and the metal trim clip member 46 contacts and engages the inner surface 362 of the substantially flat wall 332 of the coupler portion 136 of the first frame member 20 in the interior region 360 to couple the bottom endcap member 70 to the first frame member 20.

Referring to FIGS. 4, 5 and 18-20, the top endcap member 70 includes a rectangular body 1490, coupler portions 1530, 1532, 1534 and 1536. In an exemplary embodiment, the rectangular body 1490 and the coupler portions 1530, 1532, 1534, 1536 are constructed of plastic. The rectangular body 1490 includes a first end 1560 and a second end 1562.

The endcap coupler portion 1530 is configured to receive the metal trim clip member 50 therein. The endcap coupler portion 1530 is coupled to and extends outwardly from the first end 1560 of the rectangular body 1490 in the first direction. The endcap coupler portion 1130 includes a substantially flat wall 1580 and a rectangular-ring-shaped wall 1582 disposed on and coupled to the substantially flat wall 1580. The substantially flat wall 1580 has an inner surface 1585, and an aperture 1584 extending through the wall 1580. The substantially flat wall 1580 and the rectangular ring-shaped wall 1582 define an interior region 1586 that communicates with the aperture 1584.

The endcap coupler portion 1532 is configured to receive the metal trim clip member 52 therein. The endcap coupler portion 1532 is coupled to and extends outwardly from the first end 1560 of the rectangular body 1490 in the first direction. The endcap coupler portion 1532 includes a substantially flat wall 1590 and a rectangular-ring-shaped wall 1592 disposed on and coupled to the substantially flat wall 1590. The substantially flat wall 1590 has an inner surface 1595, and an aperture 1594 extending through the wall 1590. The substantially flat wall 1590 and the rectangular ring-shaped wall 1592 define an interior region 1596 that communicates with the aperture 1594.

Referring to FIGS. 5 and 18-20, the endcap coupler portion 1534 is configured to receive the metal trim clip member 54 therein. The endcap coupler portion 1534 is coupled to and extends outwardly from the second end 1562 of the rectangular body 1490 in the second direction. The endcap coupler portion 1534 includes a substantially flat wall 1600 and a rectangular-ring-shaped wall 1602 disposed on and coupled to the substantially flat wall 1600. The substantially flat wall 1600 has an inner surface 1605, and an aperture 1604 extending through the wall 1600. The substantially flat wall 1600 and the rectangular ring-shaped wall 1602 define an interior region 1606 that communicates with the aperture 1604.

The endcap coupler portion 1536 is configured to receive the metal trim clip member 56 therein. The endcap coupler portion 1536 is coupled to and extends outwardly from the second end 1562 of the rectangular body 1490 in the second direction. The endcap coupler portion 1536 includes a substantially flat wall 1610 and a rectangular-ring-shaped wall 1612 disposed on and coupled to the substantially flat wall 1610. The substantially flat wall 1610 has an inner surface 1615, and an aperture 1614 extending through the wall 1610. The substantially flat wall 1610 and the rectangular ring-shaped wall 1612 define an interior region 1616 that communicates with the aperture 1614.

Referring to FIGS. 4, 5 and 18-20, the metal trim clip member 50 is coupled to the tab member 594 of the coupler portion 530 of the second frame member 22, and the metal trim clip member 50 contacts and engages the inner surface 1585 of the substantially flat wall 1580 of the endcap coupler portion 1530 of the top endcap member 72 in the interior region 1586 to couple the top endcap member 72 to the second frame member 22.

The metal trim clip member 52 is coupled to the tab member 644 of the coupler portion 532 of the second frame member 22, and the metal trim clip member 52 contacts and engages the inner surface 1595 of the substantially flat wall 1590 of the endcap coupler portion 1532 of the top endcap member 72 in the interior region 1596 to couple the top endcap member 72 to the second frame member 22.

The metal trim clip member 54 is coupled to the tab member 694 of the coupler portion 534 of the second frame member 22, and the metal trim clip member 54 contacts and engages the inner surface 1605 of the substantially flat wall 1600 of the endcap coupler portion 1534 of the top endcap member 72 in the interior region 1606 to couple the top endcap member 72 to the second frame member 22.

The metal trim clip member 56 is coupled to the tab member 744 of the coupler portion 536 of the second frame member 22, and the metal trim clip member 56 contacts and engages the inner surface 1615 of the substantially flat wall 1610 of the endcap coupler portion 1536 of the top endcap member 72 in the interior region 1616 to couple the top endcap member 72 to the second frame member 22.

The battery cell assembly provides a substantial advantage over other battery cell assemblies. In particular, the battery cell assembly utilizes metal trim clip members which allow the first and second frame members to be readily coupled together, and de-coupled from one another if necessary for repair or maintenance, without breaking the first and second frame members.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
   a first frame member having a first rectangular ring-shaped body and a first coupler portion; the first coupler portion being coupled to and extending outwardly from a first end of the first rectangular ring-shaped body in a first direction, the first coupler portion having a first tab member;
   a first metal trim clip member being disposed on and coupled to the first tab member;
   a second frame member having a second rectangular ring-shaped body and a second coupler portion; the second coupler portion being coupled to and extending outwardly from a first end of the second rectangular ring-shaped body; the second coupler portion having first and second substantially flat walls and first and second peripheral wall portions; the first and second peripheral wall portions of the second coupler portion extending outwardly from a first side of the first substantially flat wall of the second coupler portion, the second substantially flat wall of the second coupler portion being coupled to and between the first and second peripheral wall portions of the second coupler portion and spaced apart from the first substantially flat wall of the second coupler portion; the first and second peripheral wall portions and the first and second substantially flat walls of the second coupler portion defining a first interior region therebetween, the second substantially flat wall of the second coupler portion having a first aperture extending therethrough;
   the first metal trim clip member being at least partially disposed through the first aperture and into the first interior region of the second coupler portion, the first metal trim clip member being adapted to contact and to engage an inner surface of the second substantially flat wall of the second coupler portion in the first interior region to couple the second frame member to the first frame member; and
   a first battery cell being disposed on and held between the first and second frame members.

2. The battery cell assembly of claim 1, wherein the first frame member further includes a third coupler portion; the third coupler portion being coupled to and extending outwardly from a second end of the first rectangular ring-shaped body; the third coupler portion having a second tab member;

a second metal trim clip member being disposed on and coupled to the second tab member;

the second frame member further having a fourth coupler portion; the fourth coupler portion being coupled to and extending outwardly from a second end of the second rectangular ring-shaped body; the fourth coupler portion having first and second substantially flat walls and first and second peripheral wall portions; the first and second peripheral wall portions of the fourth coupler portion extending outwardly from a first side of the first substantially flat wall of the fourth coupler portion, the second substantially flat wall of the fourth coupler portion being coupled to and between the first and second peripheral wall portions of the fourth coupler portion and spaced apart from the first substantially flat wall of the fourth coupler portion; the first and second peripheral wall portions and the first and second substantially flat walls of the fourth coupler portion defining a second interior region therebetween, the second substantially flat wall of the fourth coupler portion having a second aperture extending therethrough; and the second metal trim clip member being at least partially disposed through the second aperture and into the second interior region of the fourth coupler portion, the second metal trim clip member being adapted to contact and to engage an inner surface of the second substantially flat wall of the fourth coupler portion in the second interior region to further couple the second frame member to the first frame member.

3. The battery cell assembly of claim 1, wherein the first coupler portion of the first frame member further includes a first substantially flat wall and first and second peripheral wall portions; the first and second peripheral wall portions of the first coupler portion extending in a second direction from the first substantially flat wall of the first coupler portion; the first tab member extending in the second direction from the first substantially flat wall of the first coupler portion and being disposed between the first and second peripheral wall portions of the first coupler portion.

4. The battery cell assembly of claim 3, wherein the first coupler portion of the first frame member further includes a second substantially flat wall and third and fourth peripheral wall portions, the third and fourth peripheral wall portions extending in a third direction from the first substantially flat wall of the first coupler portion, the third direction being opposite to the second direction, the second substantially flat wall of the first coupler portion being coupled to and between the third and fourth peripheral wall portions of the first coupler portion and spaced apart from the first substantially flat wall of the first coupler portion; the third and fourth peripheral wall portions and the first and second substantially flat walls of the first coupler portion defining a second interior region therebetween, the second substantially flat wall having a second aperture extending therethrough.

5. The battery cell assembly of claim 4, further comprising a bottom endcap member, a second metal trim clip member, and a second battery cell;

the bottom endcap member having a rectangular body and a first endcap coupler portion; the first endcap coupler portion being coupled to and extending outwardly from a first end of the rectangular body, the first endcap coupler portion having a first endcap tab member; the second metal trim clip being disposed on and coupled to the first endcap tab member of the first endcap coupler portion; and the second metal trim clip member being at least partially disposed through the second aperture and into the second interior region of the first coupler portion, the second metal trim clip member being adapted to contact and engage an inner surface of second substantially flat wall of the first coupler portion in the second interior region to couple the bottom endcap member to the first frame member; the second battery cell being disposed on and held between the bottom endcap member and the first frame member.

6. The battery cell assembly of claim 1, wherein the second coupler portion of the second frame member having a second tab member extending in the first direction.

7. The battery cell assembly of claim 6, further comprising a top endcap member, a second metal trim clip member, and a second battery cell;

the top endcap member having a rectangular body and a first endcap coupler portion; the first endcap coupler portion being coupled to and extending outwardly from a first end of the rectangular body, the first endcap coupler portion having a first substantially flat wall and a rectangular ring-shaped peripheral wall portions disposed on the substantially flat wall that define a second interior region therebetween, the first substantially flat wall of the first endcap coupler portion having a second aperture extending therethrough;

the second metal trim clip member being coupled to the second tab member of the second coupler portion of the second frame member, the second metal trim clip being at least partially disposed through the second aperture and into the second interior region of the first endcap coupler portion, the second metal trim clip member being adapted to contact and to engage an inner surface of the first substantially flat wall of the first endcap coupler portion in the second interior region to couple the second frame member to the top endcap member; and the second battery cell being disposed on and held between the top endcap member and the second frame member.

8. The battery cell assembly of claim 1, wherein the first frame member further includes a thermally conductive plate having first and second plate portions, the second plate portion being coupled to an end of the first plate portion and extending substantially perpendicular to the first plate portion, the first plate portion being coupled to the first rectangular ring-shaped body of the first frame member and disposed against the first battery cell, a portion of the first plate portion extending through a wall of the first rectangular ring-shaped body, the second plate portion being disposed on an exterior surface of the first rectangular ring-shaped body.

9. The battery cell assembly of claim 1, wherein the first rectangular ring-shaped body and the first coupler portion of the first frame member are constructed of plastic.

10. The battery cell assembly of claim 1, wherein the first metal trim clip member being centered about a central plane and having first and second wall portions, the first wall portion having first and second ends, the second wall portion having first and second ends, the first end of the first wall portion being integrally coupled to the first end of the second wall portion, the first and second wall portions defining a gap between the second end of the first wall portion and the second end of the second wall portion;

the first wall portion defining a first trim tab and a first v-shaped biasing member, the first trim tab of the first wall portion extending across a portion of the gap toward the second wall portion, the first v-shaped biasing member having an apex pointing away from the second wall portion;

the second wall portion defining a second trim tab and a second v-shaped biasing member, the second trim tab extending across a portion of the gap toward the first wall portion, the second v-shaped biasing member having an apex pointing away from the first wall portion;

the first trim tab and the second trim tab being adapted to contact opposite sides of the first tab member of the first coupler portion of the first frame member to hold the first tab member therebetween; and the first v-shaped biasing member and the second v-shaped biasing member adapted to contact and engage the inner surface of the second substantially flat wall of the second coupler portion of the second frame member in the first interior region to couple the second frame member to the first frame member.

* * * * *